(12) United States Patent
Suresh et al.

(10) Patent No.: US 10,346,343 B2
(45) Date of Patent: Jul. 9, 2019

(54) HARDWARE ACCELERATOR FOR PLATFORM FIRMWARE INTEGRITY CHECK

(71) Applicant: Intel Corporation, Santa Clara, CA (US)

(72) Inventors: Vikram Suresh, Hillsboro, OR (US); Sudhir Satpathy, Hillsboro, OR (US); Sanu Mathew, Hillsboro, OR (US); Neeraj Upasani, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 251 days.

(21) Appl. No.: 15/192,739

(22) Filed: Jun. 24, 2016

(65) Prior Publication Data
US 2017/0373839 A1 Dec. 28, 2017

(51) Int. Cl.
*H04L 9/00* (2006.01)
*G06F 13/42* (2006.01)
*G06F 21/44* (2013.01)
*G06F 12/1009* (2016.01)
*G06F 12/14* (2006.01)
*G06F 13/16* (2006.01)
*G06F 21/57* (2013.01)
*G06F 21/76* (2013.01)
(Continued)

(52) U.S. Cl.
CPC ...... *G06F 13/4282* (2013.01); *G06F 12/1009* (2013.01); *G06F 12/1408* (2013.01); *G06F 13/1668* (2013.01); *G06F 21/44* (2013.01); *G06F 21/575* (2013.01); *G06F 21/76* (2013.01); *G06F 21/79* (2013.01); *G09C 1/00* (2013.01); *H04L 9/0618* (2013.01); *H04L 9/3239* (2013.01); *G06F 2212/1052* (2013.01); *G06F 2212/402* (2013.01)

(58) Field of Classification Search
USPC ......................................................... 713/192
See application file for complete search history.

(56) References Cited

U.S. PATENT DOCUMENTS 6,401,208 B2    6/2002  Davis et al.
7,199,608 B1 *  4/2007  Trimberger ...... H03K 19/17732
                                                    326/38
(Continued)

OTHER PUBLICATIONS

International Search Report and Written Opinion for PCT/US2017/033858, 16 pages, dated Aug. 11, 2017.

*Primary Examiner* — Christopher J Brown
(74) *Attorney, Agent, or Firm* — Lowenstein Sandler LLP

(57) ABSTRACT

Encryption of a BIOS using a programmable logic device (PLD) is described. A PLD may include a static random-access memory area including programmable logic in a Lookup Table to receive a request to authenticate a basic input/output system (BIOS) executing on a processor coupled to the PLD. The PLD may calculate a hash value of a message associated with the BIOS using a Secure Hash Algorithm (SHA). The PLD may also include a random-access memory area including a first embedded random access memory block (EBR) to store a first portion of a 256-bit message digest associated with the message, a fifth portion of the 256-bit message digest, and second, third, fourth, sixth, seventh, and eighth EBRs to store second, third, fourth, sixth, seventh, and eighth portions of the 256-bit message digest, respectively.

24 Claims, 16 Drawing Sheets

(51) Int. Cl.
    *G06F 21/79*      (2013.01)
    *G09C 1/00*       (2006.01)
    *H04L 9/32*       (2006.01)
    *H04L 9/06*       (2006.01)

(56) References Cited

U.S. PATENT DOCUMENTS

| | | | |
|---|---|---|---|
| 8,275,125 | B2 | 9/2012 | Vijayarangan |
| 8,438,377 | B2 | 5/2013 | Senda |
| 9,361,449 | B2 * | 6/2016 | Sugano ............... G06F 21/44 |
| 2006/0020810 | A1 * | 1/2006 | Waltermann ......... G06F 21/121 |
| | | | 713/179 |
| 2011/0087872 | A1 * | 4/2011 | Shah ................... H04L 9/3236 |
| | | | 713/2 |
| 2012/0324238 | A1 | 12/2012 | Senda |
| 2014/0365755 | A1 | 12/2014 | Liu et al. |
| 2016/0027015 | A1 * | 1/2016 | Redpath ............. G06Q 20/4012 |
| | | | 705/72 |

\* cited by examiner

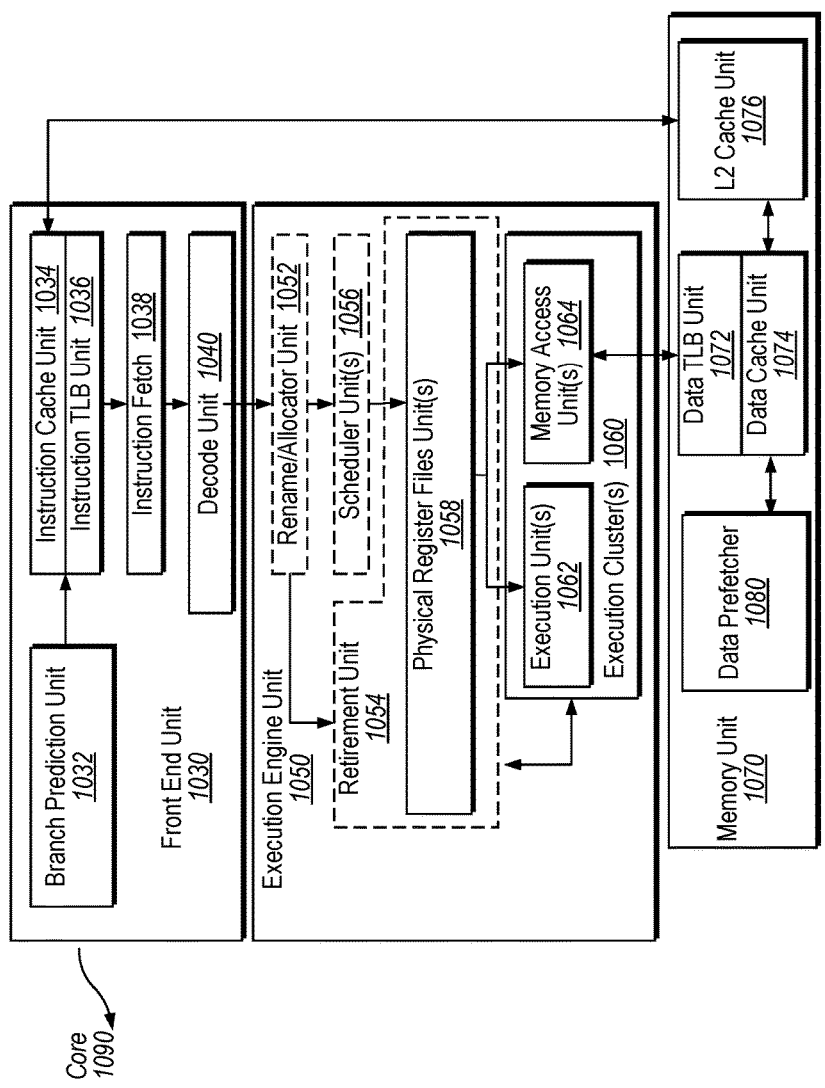
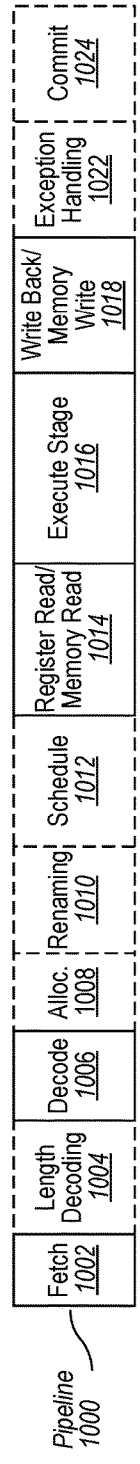
FIG. 10A
FIG. 10B

US 10,346,343 B2

HARDWARE ACCELERATOR FOR PLATFORM FIRMWARE INTEGRITY CHECK

The present disclosure pertains to the field of processors and, in particular, to SHA-256 encryption of a Basic Input/Output System (BIOS) by a programmable logic device.

BACKGROUND

A basic input/output system (BIOS) is a type of firmware used to perform hardware initialization during the startup of computer systems. The BIOS may also provide runtime services for operating systems (OS) and programs. BIOS firmware may be built into personal computers. The BIOS may additionally provide an abstraction layer for the hardware, allowing for a consistent way for application programs and operating systems to interact with devices connected to the computer.

BRIEF DESCRIPTION OF THE DRAWINGS

Various embodiments of the present disclosure will be understood more fully from the detailed description given below and from the accompanying drawings of various embodiments of the disclosure. The drawings, however, should not be taken to limit the disclosure to the specific implementations, but are for explanation and understanding only.

FIG. 10A is a block diagram illustrating a micro-architecture for a processor that implements BIOS authentication operations according to one embodiment.

FIG. 10B is a block diagram illustrating an in-order pipeline and a register renaming stage, out-of-order issue/execution pipeline according to one embodiment.

DESCRIPTION OF EMBODIMENTS

Figure 1:
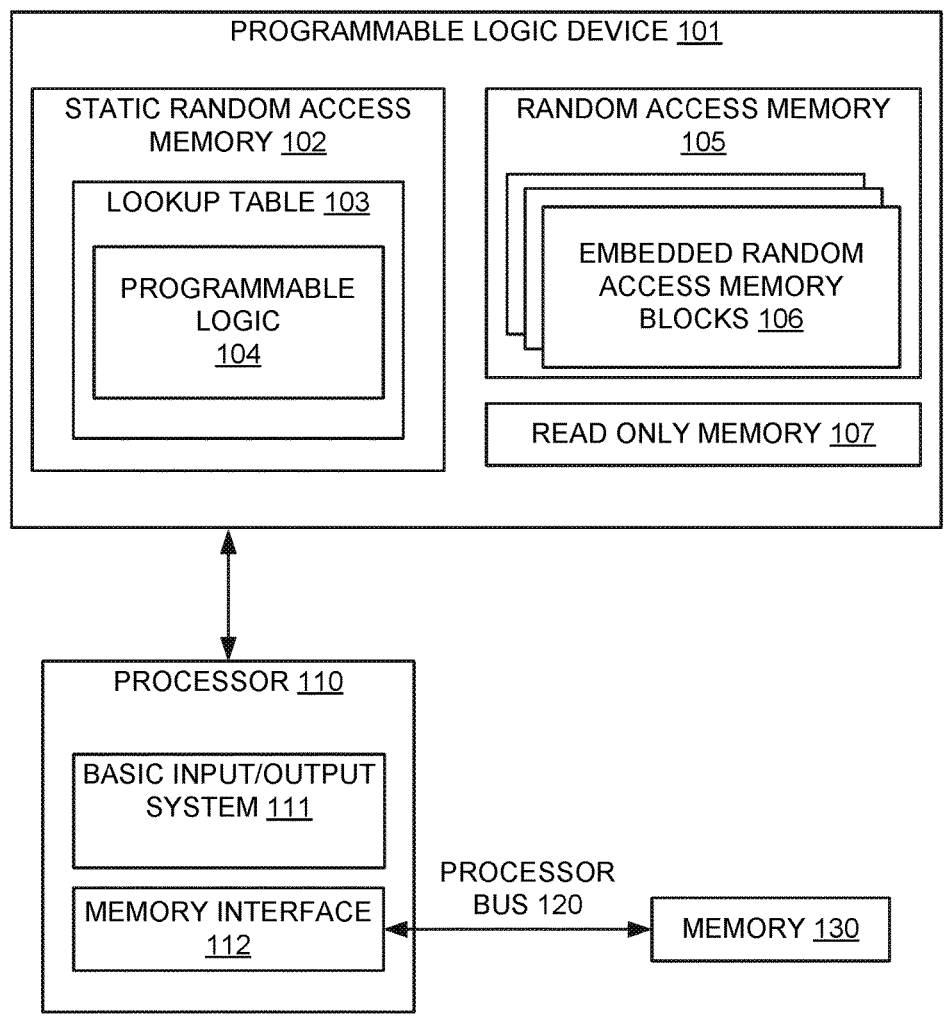
FIG. 1 is a block diagram illustrating a computing system that implements a hardware accelerator for platform firmware integrity check according to one embodiment.

Processors may implement BIOS authentication to prevent anything being read from the hard disk, such as the operating system, until the user has confirmed they have the correct password or other credentials. To improve the efficiency of BIOS authentication, embodiments of the present disclosure enable a programmable logic device to map BIOS authentication operations and storage to on-chip Embedded Block Random Access Memory (EBR). Although the operations described herein refer to EBRs for the sake of convenience, it should be noted that other types of memory including, but not limited to, Random Access Memory (RAM), embedded-RAM, or on-chip-RAM may be interchangeably used in place of EBRs.

BIOS authentication may be performed via off-chip implementation of the Secure Hash Algorithm (SHA). SHA-256 is one of a set of cryptographic hash functions designed by the National Security Agency (NSA). Cryptographic hash functions are mathematical operations run on digital data; by comparing the computed "hash" (the output from execution of the algorithm) to a known and expected hash value, a computer can determine the data's integrity.

When a message is input to a hash algorithm, the result is an output called a message digest. The message digests may range in length from 160 to 512 bits, depending on the algorithm. The message digest has a one-to-one relationship with the original message, and even the smallest of changes to the original message will result in a large change to the message digest. In the context of BIOS authentication, the original BIOS code may be run through SHA-256 to determine a correct message digest. Upon subsequent boots, the BIOS code may be run through SHA-256 and the resulting message digest can be compared against the original, correct message digest to verify that the BIOS code has not been tampered with.

A generic sequence of events beginning with the booting of a computer may include booting the:
1. Basic Input/Output System (BIOS)
2. Master boot record (MBR) partition table
3. Pre-boot authentication (PBA)
4. Operating system (OS)

At the time the BIOS boots and the authentication of the BIOS is to be performed, the operating system may not yet have booted, and therefore the OS may not be capable of performing the authentication. Thus, BIOS authentication may be performed by a micro-controller interfaced with the BIOS memory. This solution can be performance intensive and may result in large latency. Instead, an off-chip programmable logic device (PLD) may be used to perform BIOS authentication as set for in the embodiments described herein. Performing BIOS authentication via a PLD advantageously allows for a device, such as a Field Programmable Gate Array (FPGA) or a Complex Programmable Logic Device (CPLD), to perform the authentication on the processor itself. PLDs have Look Up Table (LUT) modules that are used to perform logic. Since SHA-256 operations are dominated by sequential logic, directly mapping the SHA-256 resources to a PLD may result in heavy utilization of the PLD's Look Up Table (LUT) modules. The embodiments described herein may address mapping of SHA-256 operations and resources to PLDs by utilizing the LUT modules of a PLD to calculate and compare the calculated hash value of a BIOS, while embedded random access memory blocks (EBR) of a random access memory (RAM) area of the PLD are utilized to store SHA-256 resources. In one embodiment, the calculated hash value of the BIOS may be stored in a ROM of the PLD. In other embodiments, the calculated hash value may be stored in other areas of the PLD, such as a SRAM area, RAM area, or in LUTs.

The embodiments described herein may address mapping of SHA-256 operations and resources to PLDs by utilizing the LUT modules of a PLD to calculate and compare the calculated hash value of a BIOS, while random access memory blocks (EBR) of a random access memory (RAM) area of the PLD are utilized to store SHA-256 resources. By utilizing the RAM area of a PLD, LUT utilization is reduced and BIOS authentication is more efficient.

FIG. 1 is a block diagram illustrating a computing system that implements a hardware accelerator for platform firmware integrity check according to one embodiment. The computing system 100 is formed with a processor 110 that includes a basic input/output system (BIOS) and a memory interface 112. The computing system 100 may be any device or combination of devices, but the description of various embodiments described herein is directed to processing devices and programmable logic devices.

System 100 includes a memory interface 112 and memory 130. In one embodiment, memory interface 112 may be a bus protocol for communication from processor 110 to memory 130. Memory 130 includes a dynamic random access memory (DRAM) device, a static random access memory (SRAM) device, flash memory device, or other memory device. Memory 130 stores instructions and/or data represented by data signals that are to be executed by the processor 110. The processor 110 is coupled to the memory 130 via a processor bus 110. A system logic chip, such as a memory controller hub (MCH) may be coupled to the processor bus 110 and memory 130. An MCH can provide a high bandwidth memory path to memory 130 for instruction and data storage and for storage of graphics commands, data and textures. The MCH can be used to direct data signals between the processor 110, memory 130, and other components in the system 100 and to bridge the data signals between processor bus 110, memory 130, and system I/O, for example. The MCH may be coupled to memory 130 through a memory interface (e.g., memory interface 112). In some embodiments, the system logic chip can provide a graphics port for coupling to a graphics controller through an Accelerated Graphics Port (AGP) interconnect. The system 100 may also include an I/O controller hub (ICH). The ICH can provide direct connections to some I/O devices via a local I/O bus. The local I/O bus is a high-speed I/O bus for connecting peripherals to the memory 130, chipset, and processor 110. Some examples are the audio controller, firmware hub (flash BIOS), wireless transceiver, data storage, legacy I/O controller containing user input and keyboard interfaces, a serial expansion port such as Universal Serial Bus (USB), and a network controller. The data storage device can include a hard disk drive, a floppy disk drive, a CD-ROM device, a flash memory device, or other mass storage device.

System 100 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, system 100 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments described herein are not limited to computer systems. Alternative embodiments of the present disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 110 includes one or more execution units. One embodiment may be described in the context of a single processor desktop or server system, but alternative embodiments may be included in a multiprocessor system. System 100 may be an example of a 'hub' system architecture. The computer system 100 includes a processor 110 to process data signals. The processor 110, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 110 is coupled to a processor bus 110 that transmits data signals between the processor 110 and other components in the system 100. Other elements of system 100 may include a graphics accelerator, memory controller hub, I/O controller hub, wireless transceiver, Flash BIOS, Network controller, Audio controller, Serial expansion port, I/O controller, etc.

In one embodiment, the processor 110 includes a Level 1 (L1) internal cache memory. Depending on the architecture, the processor 110 may have a single internal cache or multiple levels of internal caches. Other embodiments include a combination of both internal and external caches depending on the particular implementation and needs.

For another embodiment of a system, BIOS authentication can be implemented by a system on a chip (SoC). One embodiment of a SoC includes of a processor and a memory. The memory of the SoC may be a flash memory. The flash memory can be located on the same die as the processor and other system components. Additionally, other logic blocks such as a memory controller or graphics controller can also be located on a SoC.

System 100 includes a programmable logic device (PLD) 101 operatively coupled to the processor 110. In one embodiment, PLD 101 may be a field-programmable gate array (FPGA). In other embodiments, PLD 101 may be a complex programmable logic device (CPLD), Generic array logic (GAL), programmable logic array (PLA), or other type of PLD. In one embodiment, processor 110 and PLD 101 may be included on a single circuit board, each in their respective locations.

PLD 101 is an integrated circuit used to build reconfigurable digital circuits. The PLD 101 can be an electronic component used in connection with other components or other integrated circuits, such as processor 110. In general, PLDs can have undefined functions at the time of manufacturing and can be programmed or reconfigured before use. The PLD 101 can be a combination of a logic device and a memory device. The memory of the PLD 101 can store a pattern that was given to the integrated circuit during programming. Data can be stored in the integrated circuit using various technologies, such as antifuses, Static Random Access Memory (SRAM), EPROM cells, EEPROM cells, flash memory, or the like. The PLD 101 can use any type of PLD technology, but the embodiments herein are described with respect to FGPA and CPLD technologies. FPGAs are internally based on LUTs, whereas CPLDs have a macrocell as the main building block of logic functions. A macrocell is a higher-level logic function, such as flip-flops, ALU functions, registers, and the like.

In one embodiment, PLD 101 includes SRAM area 102, RAM area 105, and read-only memory (ROM) 107. Memory 107 may store instructions and/or data represented by data signals that are to be executed by the PLD 101. SRAM area 102 may include multiple lookup tables (LUTs). In one embodiment, a lookup table is an array that replaces runtime computation with an array indexing operation. For example, lookup table 103 may include programmable logic 104 to perform BIOS authentication operations as described herein. RAM area 105 may include embedded random access memory blocks (EBRs) 106. In one embodiment, EBRs 106 and ROM 107 may be used by PLD 101 to store data associated with BIOS authentication operations, as described herein.

In one embodiment, a SHA-256 algorithm may include a 256-bit message digest, which may be a constant initial hash state (e.g., an initial 512-bit state message) or a previous hash (e.g., a prior 512-bit state message), depending on which round the SHA-256 hashing operations are in. The digest may be stored in a state register (State_Reg) in EBR 106 and may be updated with the output of the SHA round every cycle. The 512-bit message to be hashed may be stored in EBR 106 as 16 words in a message register (Msg_Reg). It is worth mentioning that the message may be larger than 512 bits, and broken down into 512-bit portions on which to operate. One 32-bit word of the original message may be consumed by the SHA function programmable logic 104 in LUTs 103 in rounds 0 through 15 (e.g., 16 rounds). At the same time, a message schedule algorithm (e.g., in programmable logic 104) consumes four words of the message to generate a new 32-bit message word. These new message words may be used in SHA rounds 16 through 63 (for 64 rounds total) by a message scheduler to generate new 32-bit message words for each subsequent round. A single-stage pipelined architecture may take 64 cycles (rounds) to hash a 512-bit message to produce a 256-bit signature which may be used as the initial state of the next 512-bit state message SHA-256 hashing rounds. It should be noted that the above operations can be scaled down to operate on 16, 8, 4, or 2 bits at a time, instead of 32. For simplicity, the operations described herein will be described with respect to 32-bit operations.

In one embodiment, the 256-bit digest in State_Reg (e.g., in EBR 106) may be divided into eight, 32-bit words, A-H, which may either be the initial state, default state, or the output of the previous round. The words A and E may go through 32-bit functions $\Sigma 0$ and $\Sigma 1$ respectively, which perform a series of shift and rotate operations followed by an XOR operation. Furthermore, "Maj" and "Ch" functions (e.g., in programmable logic 104) may perform logic operations on words A through C, and E through G respectively. The outputs of these functions are added with words D and H, as well as the input message from the Msg_Reg and a 32-bit round constant (Kt). In one embodiment, the round constant is stored in LUT 103. In one embodiment, the addition is performed modulo $2^{32}$. The round outputs (A_new and E_new) update the words A and E of the State_reg. The remaining words (B-D and F-H) may be obtained by right shifting the state register by 32 positions (e.g., B_new is A, C_new is B, etc.).

In one embodiment, a message scheduler similarly implements functions $\sigma 0$ and $\sigma 1$ on 32-bit words of Msg_Reg[1] and Msg_Reg[14] respectively, followed by a $2^{32}$ modulo addition with Msg_Reg[15] and Msg_Reg[6]. The contents of the Msg_Reg are shifted left by 32 positions with the new message stored in Msg_Reg[0]. Additional details about the above operations are further explained with respect to FIGS. 1-9 of this disclosure.

Figure 2:
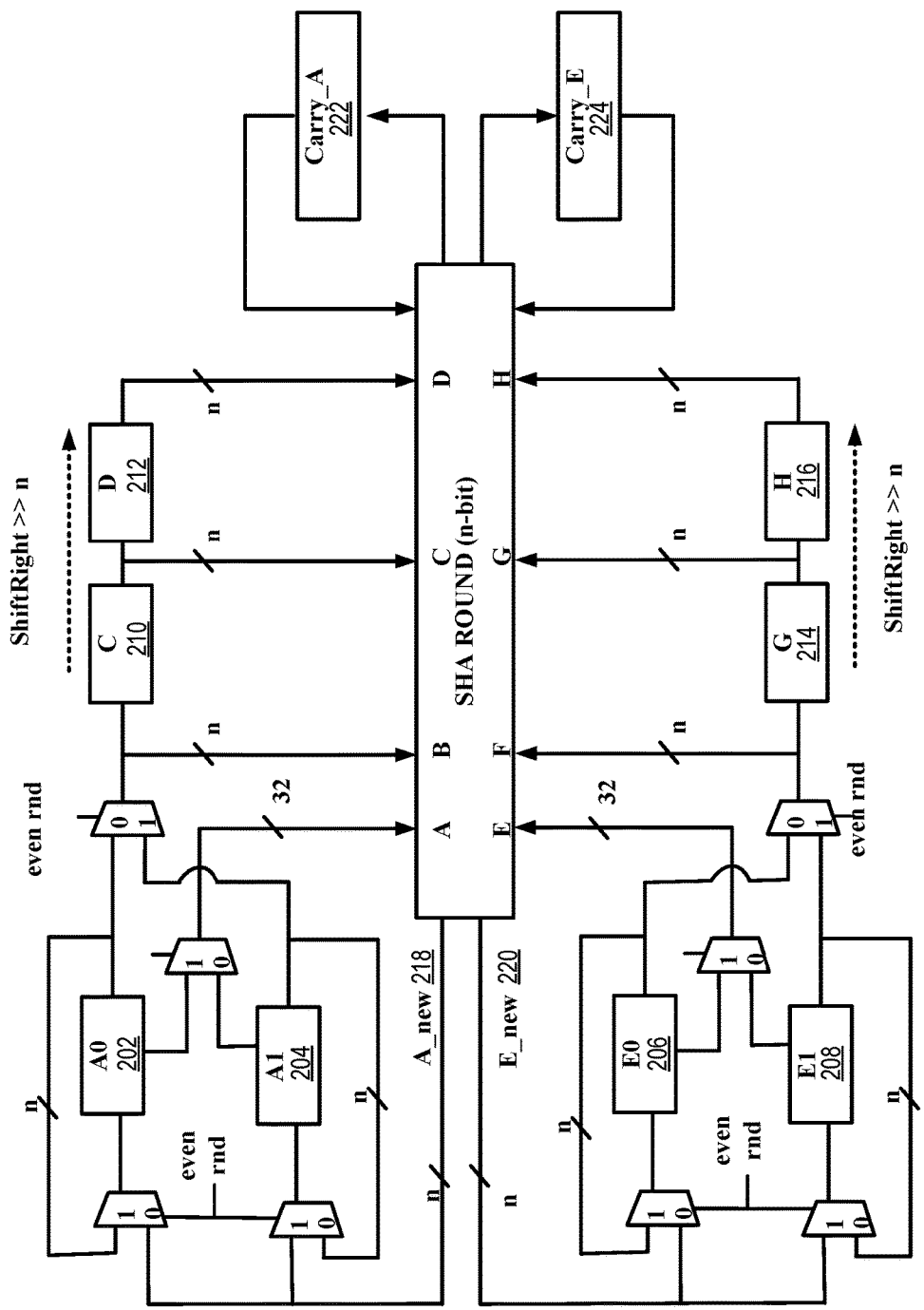
FIG. 2 is a block diagram illustrating microarchitecture of an n-bit SHA-256 message digest according to one embodiment.

FIG. 2 is a block diagram illustrating microarchitecture of an n-bit SHA-256 message digest according to one embodiment. In one embodiment, initially 32-bit state registers A, B and E, F are mapped to A0 202, A1 204, E0 206, and E1 208, respectively. An initial 256-bit hash value may be loaded into A0 202, A1 204, C 210, D 212, E0 206, E1 208, G 214, H 216. During even rounds, A1 may contain the word B while A0 contains the word A and during odd rounds A0 may contains the word B while A1 contains the word A. Similarly, during even rounds, E1 contains the word F while E0 contains the word E and during odd rounds E0 may contain the word F while E1 contains the word E. The inputs to the SHA round may be selected between A0/A1 and E0/E1 depending on the round number. Each cycle, the SHA round may generate n-bits of A_new 218 and E_new 220. These bits may be stored in the most significant bit (MSB) of A1/A0 and E1/E0 respectively, depending on the round number.

In one embodiment, the registers containing words C, D, G, H may be shifted right by n positions every cycle with the lower n-bits of the current round word B and word F shifted into the MSB of C and G respectively. The 32-bit registers acting as A and E may be rotated right by n positions every cycle. In one embodiment, the round logic generates a carry out for n<32 (e.g., 222, 224), which is fed back into the SHA round in the subsequent cycle. Since the round function consumes n-bits each cycle, each SHA round may span for 32/n cycles. At the end of 32/n cycles, the carry output may be discarded to adhere to modulo $2^{32}$ addition.

In one embodiment, the state registers A0 202, A1 204, C 210, D 212, E0 206, E1 208, G 214, H 216 are not directly mapped into individual memory blocks due to limitations in the number of read/write access ports, but instead mapped to two EBRs. One memory mapping embodiment of the state registers is shown in FIG. 3.

Figure 3:
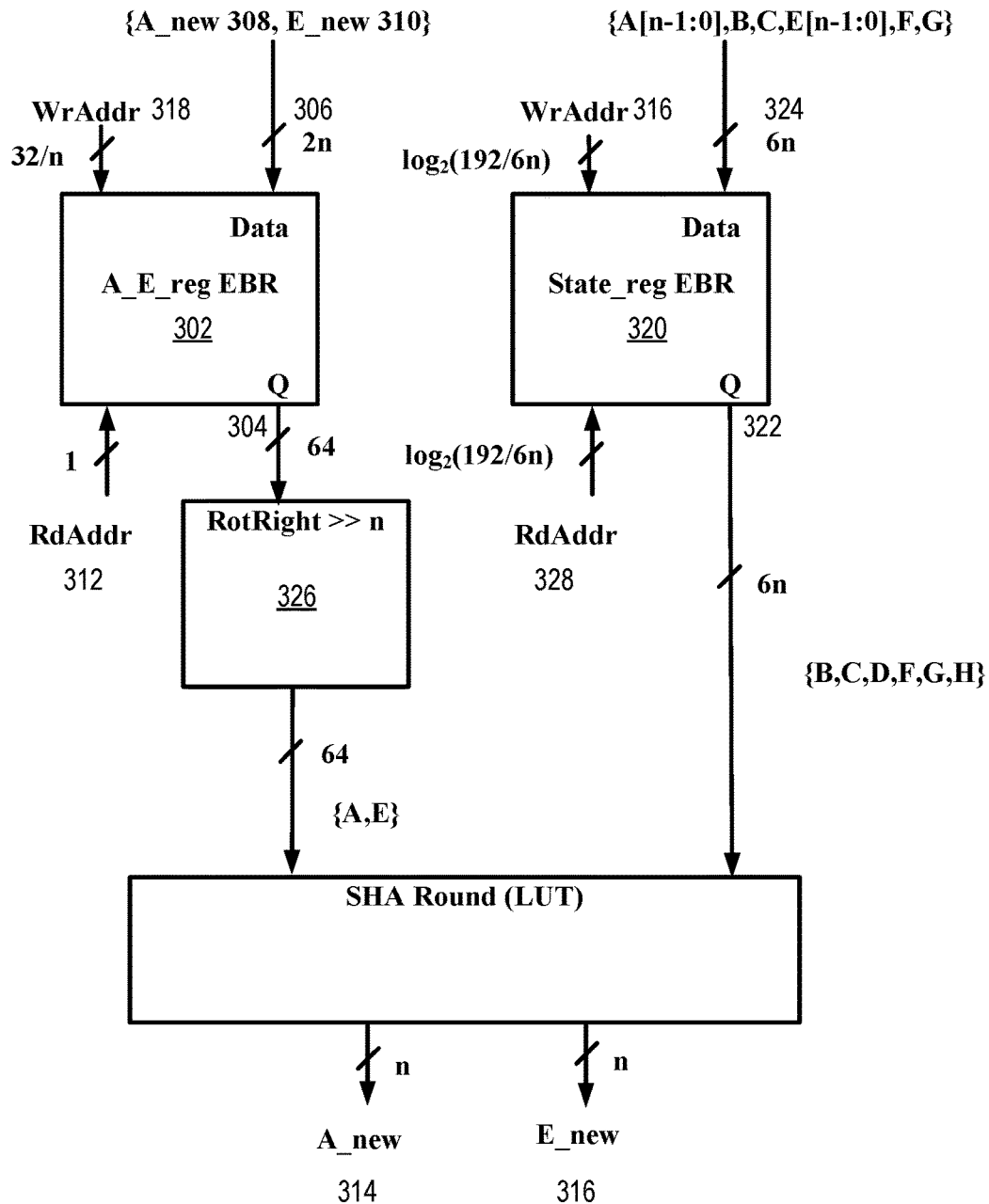
FIG. 3 is a block diagram illustrating memory mapping of state registers according to one embodiment.

FIG. 3 is a block diagram illustrating memory mapping of state registers according to one embodiment. In one embodiment, the registers A and E (a first portion of a 256-bit message digest register) are mapped to a 128-bit EBR 302, with a 64-bit read port 304 and 2n-bit write port 306. Since the states A and E go through the $\Sigma$ functions in the message digest, the 32-bits of current A and E are used for the generation of each n-bit state of A_new 308 and E_new 310. The 64-bit read port 304 of the EBR 302 may be used to access the current state of A and E from a single address (32 bits of A and 32 bits of E). The single bit read address 312 may be held constant for the entire 32/n clock cycles of each message digest round (e.g., it can be held at 0 to access A0 and E0, and the next round it can be held at 1 to access A1 and E1). The new states of A and E, which are the n-bit wide A_new 314 and E_new 316 outputs of the SHA round are written back into the same location of A_E_reg each cycle by incrementing the 32/n bit write address 318 to complement the read address 312. For example, if the read address 312 was 0, to read A0 and E0, the write address 318 may be 1, to write to A_new and E_new to A1 and E1. The 128-bit EBR may be accessed as two 64-bit banks, with the current 32-bit states of A and E read from one bank and the new 32-bit states written into the other bank across 32/n cycles in each digest round. For the next round of digest, the read address may be inverted and the recently written states of A and E may be read as the current 32-bit states. The MSB of the write address may also be complemented to over-write the previous states. Combining the states A and E into a single memory bank may reduce the number of EBRs required for storing these states, as well as optimizes the logic for address generation.

The remaining six states (B, C, D, F, G, H) may be combined (into a second portion of the 256-bit message digest register) and stored in a 192-bit EBR, State_reg 320, with 6n-bit (e.g., six times the size of a data path associated with the message digest) read 322 and 6n-bit write 324 ports. The 6n-bit read and write may represent n bits of each of B, C, D, F, G, H. The 192-bit EBR may be divided into 32/n memory locations containing n-bit nibbles of B, C, D, F, G, H. In one embodiment, n-bits of states B, C, D, F, G, and H may be read through the 6n-bit read port 322 each cycle. The n-bits of states A and E, A_E_reg[n−1:0] and A_E_reg[31+n :32], obtained after the rotate right operation 326, provide 32-bits of current state A and E across 32/n cycle and may be combined, via hashing combination logic, with n-bits of the current states of B, C, F, and G to generate the new states of B through H. A[n−1:0], B, C, E[n−1:0], F, and G may form the 6n-bit data that is written back into the previously read location. This embodiment may implement the ShiftRight>>n operation shown in FIG. 2. Across 32/n cycles in each message digest round, the current states of A, B, C, E, F and G are shifted into B, C, D, F, G and H respectively in the SHA round implemented by LUTs. The write address 326 of State_reg 320 may be generated by decrementing the read address 328 every cycle.

Figure 4:
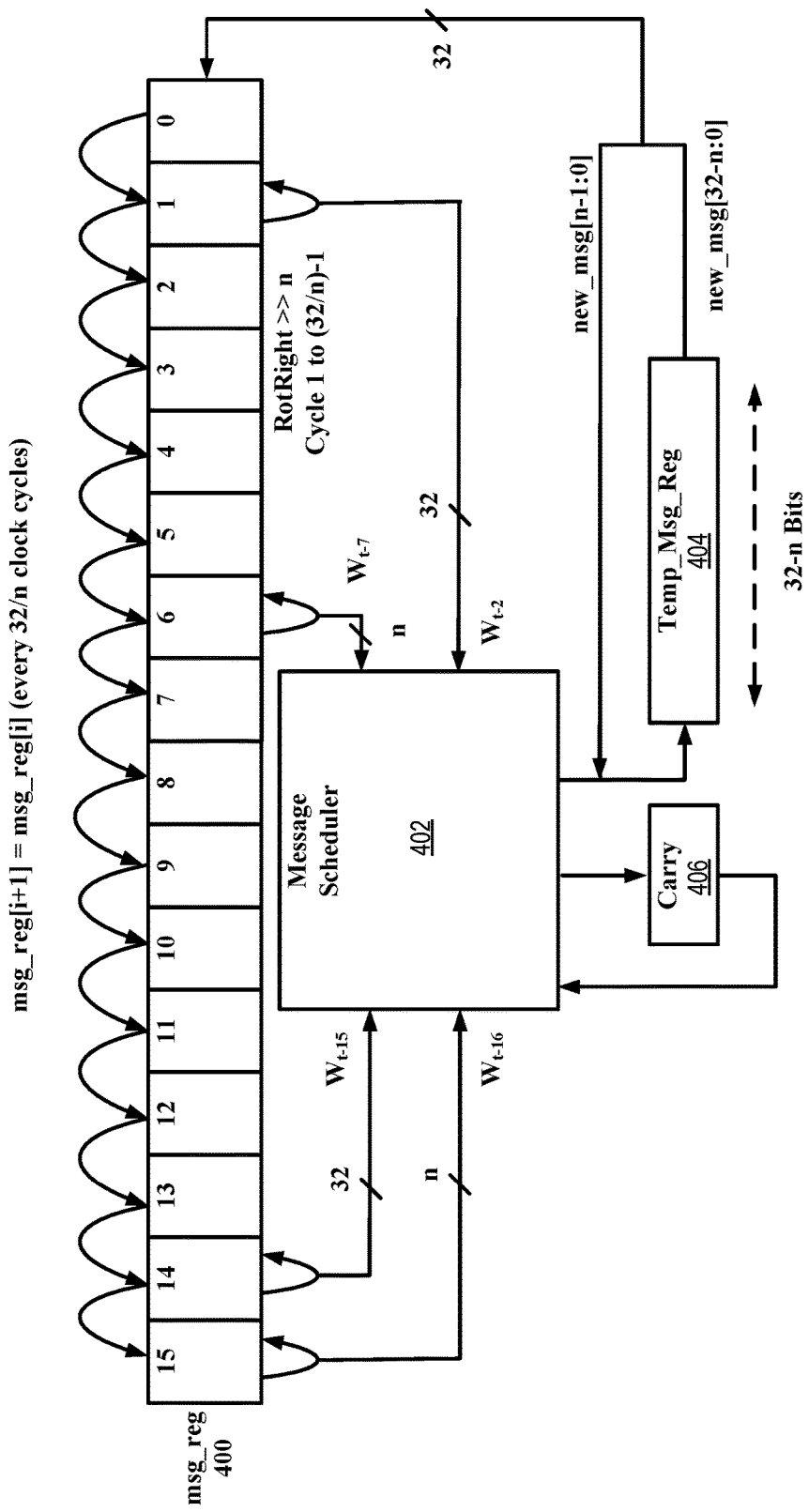
FIG. 4 is a block diagram illustrating microarchitecture of a SHA-256 message scheduler with an n-bit datapath according to one embodiment.

FIG. 4 is a block diagram illustrating microarchitecture of a SHA-256 message scheduler with an n-bit datapath, according to one embodiment. One embodiment of message scheduler 402 logic for an n-bit SHA256 implementation is as shown in FIG. 4. The message words Wt-15 and Wt-2 undergo σ0 and σ1 functions respectively, involving rotation and shift operations. Each cycle, the n-bit message schedule logic may consume 32-bits of Wt-15 and 32-bits of Wt-2 and n-bits of Wt-16 and Wt-7. The contents of registers msg_reg [15], msg_reg[14], msg_reg[6] and msg_reg[1] may be rotated right by n positions every cycle. This may provide the n-least significant bits of Wt-16, Wt-7 and the appropriately aligned 32-bits of Wt-15, and Wt-2 for the σ functions. In one embodiment, the n-bit output of the message scheduler is stored in a temporary register 404. The carry output of register 406 generated (for n<32) every cycle is fed back into the message scheduler in the subsequent cycles. Similar to the SHA round, each message schedule operation may consume 32/n cycles. In one embodiment, at the end of 32/n cycles the carry register 406 is cleared and the contents of the msg_reg 400 are shifted left by 32 positions with the new intermediate message Wt shifted into msg_reg[0]. In one embodiment, the carry and the temporary message register may be implemented by LUTs. The mapping of message register 400 to memory banks is shown in FIG. 5.

Figure 5:
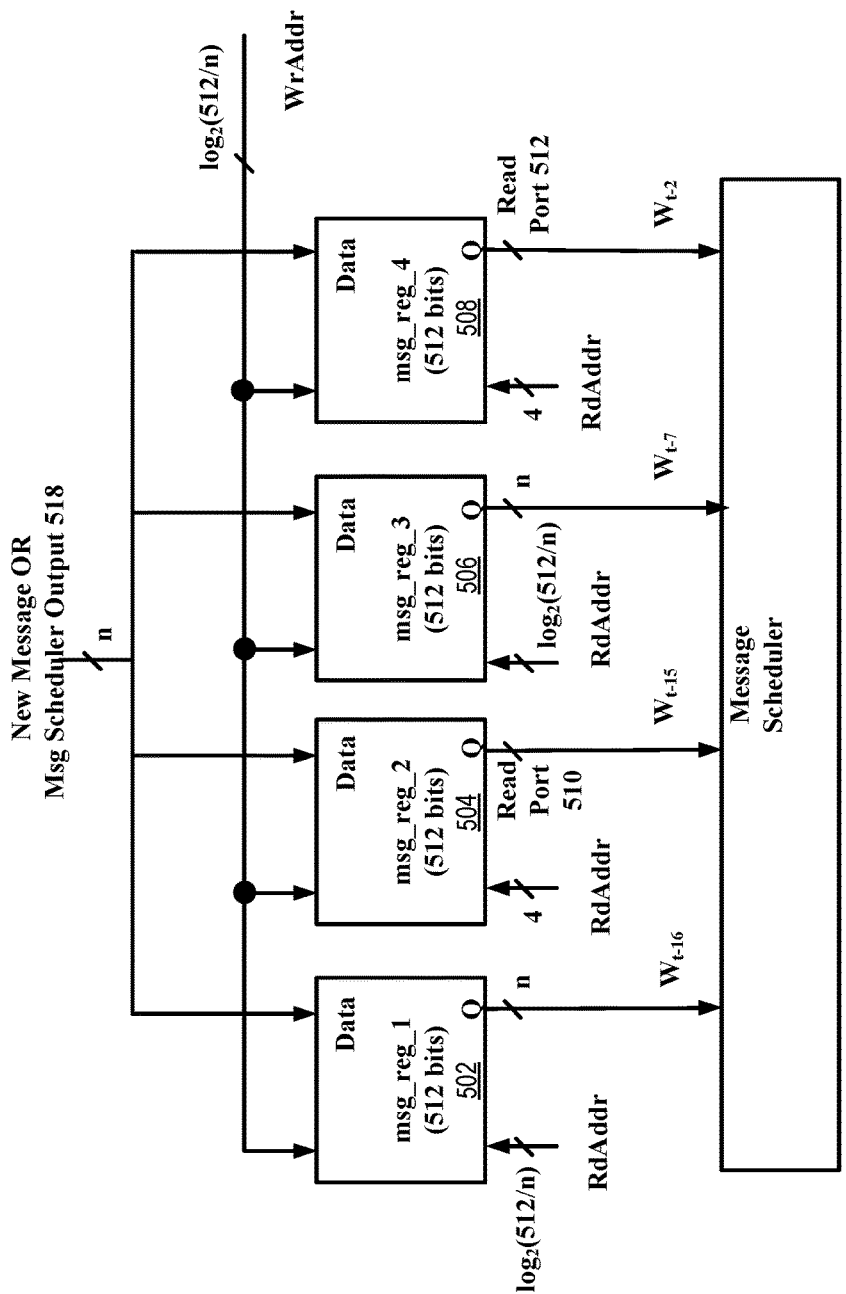
FIG. 5 is a block diagram illustrating memory mapping for message registers according to one embodiment.

FIG. 5 is a block diagram illustrating memory mapping for message registers according to one embodiment. In one embodiment, a copy of the 512-bit content of the message register is stored in four 512-bit EBR memory banks (msg_regs 502-508) to individually access Wt-16, Wt-15, Wt-7 and Wt-2. Since Wt-15 and Wt-2 go through the σ functions described previously, the EBRs used to access Wt-15 and Wt-2 may have a 32-bit read port (e.g., 510 and 512). The remaining two EBRs used to access Wt-16 and Wt-7 may have an n-bit read port (e.g. 514 and 516). In one embodiment, all four EBRs 502-508 have an n-bit write port 518 to store the incoming new message of the BIOS page or a new message double word generated by the scheduler. The read addresses of the four EBRs are set initially to point to the locations of the respective double words. The read address of msg_reg_1 and msg_reg_3 may be incremented every cycle to read n bits of Wt-16 and Wt-7 respectively. The read address of msg_reg_2 and msg_reg_4 may be incremented once every message schedule round (e.g., every 32/n cycles) to read the next 32-bit double word of Wt-15 and Wt-2 respectively. The four EBRs may share a common write address and update the state of current Wt-16 with the new message every clock cycle.

Figure 6:
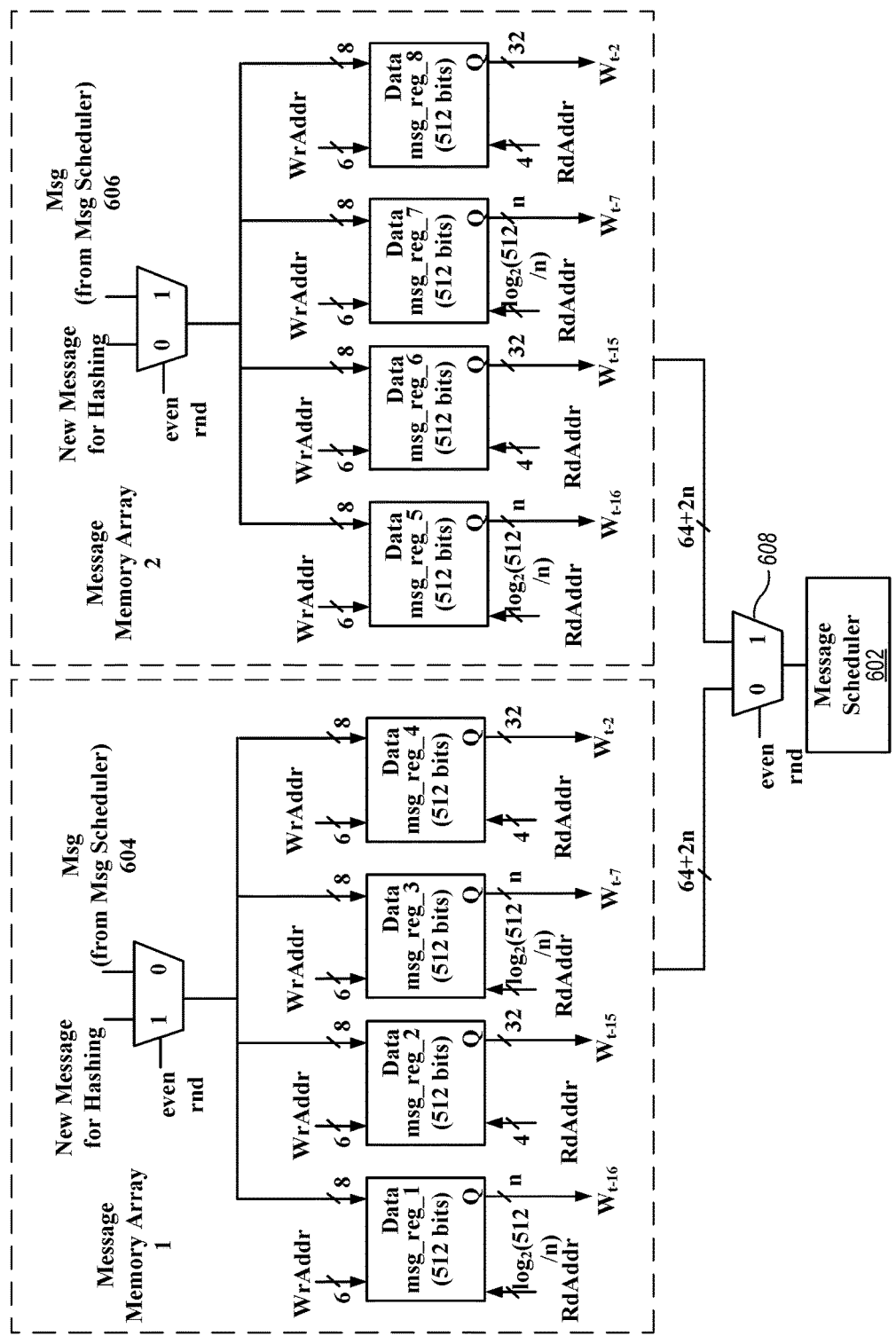
FIG. 6 is a block diagram illustrating dual message memory array for message expansion and collection according to one embodiment.

FIG. 6 is a block diagram illustrating dual message memory array for message expansion and collection according to one embodiment. The message scheduler 602 may store an incoming 512-bit block of the next message from the BIOS. In one embodiment, two separate message memory arrays are created to simultaneously perform new message collection and expansion of existing messages. When the message 604 in array 1 is expanded and consumed by the SHA message digest, memory array 2 may receive the next 512-block of message 606 to be hashed in the subsequent rounds. The two arrays may alternate between the two operations every 64 rounds of hashing via a multiplexor 608.

Figures 7A, 7B:
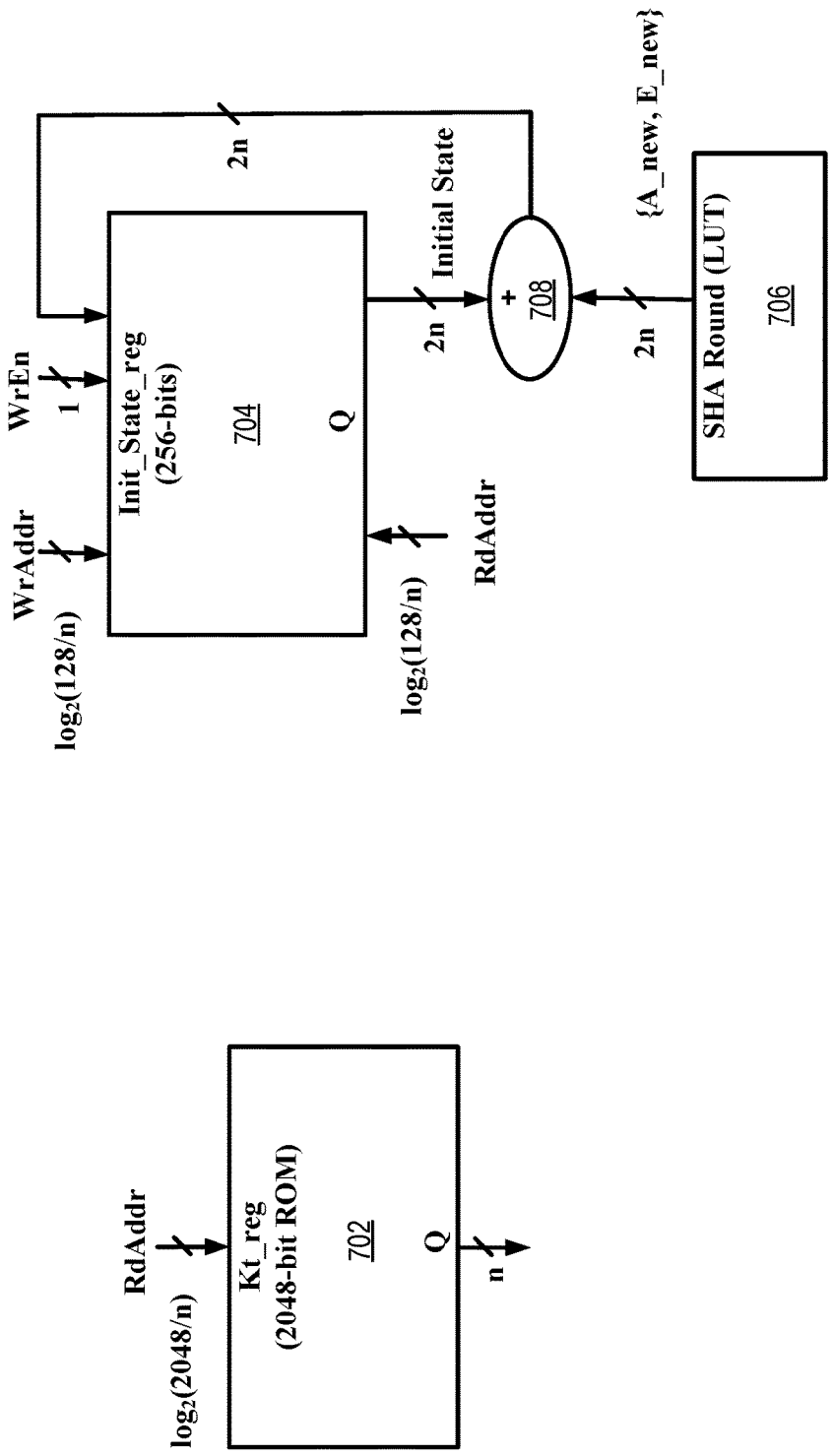
FIG. 7A is a block diagram illustrating on-chip ROM block for storing round constants according to one embodiment.
FIG. 7B is a block diagram illustrating memory mapping of an initial state register according to one embodiment.

FIG. 7A is a block diagram illustrating on-chip ROM block for storing round constants according to one embodiment. In one embodiment, the unique 32-bit round constants for each of the 64 SHA rounds are mapped to an on-chip embedded ROM 702. Since only n-bits of the constant are utilized each cycle, the embedded ROM may be configured as a 2048-bit ROM with a log 2(2048/n) bit address port and an n-bit data port. Advantageously, mapping the round constants to on-chip block memory completely eliminates the desire for any logic to generate round constants, thereby minimizing the LUT utilization.

FIG. 7B is a block diagram illustrating memory mapping of an initial state register according to one embodiment. In one embodiment, the initial state register stores the initial working state of the message digest, which is added to the working state using hashing combination logic at the end of 64 rounds of SHA-256 to obtain the 256-bit initial state for the next round of hashing. The 256-bit initial state register may be mapped to a 256-bit initial state EBR 704 with 2n-bit read/write ports. Advantageously, this allows the n-bits of A and E, B and F, C and G, and D and H to be stored and accessed together from the same location. Since the n-bit SHA datapath takes 2048/n cycles to complete 64 rounds, starting from cycle 1920/n, n-bits of the final D/H are generated by the SHA round digest 706. These may be added 708 to the D/H of the initial state and written back into the Init_State_reg 704. Over the next 128/n cycles, the final working state A through H may be added to the initial state 2n-bits at a time to compute the initial state for the next round of hashing instead of waiting for all 64 SHA rounds to complete before compute the new initial state.

Figure 8:
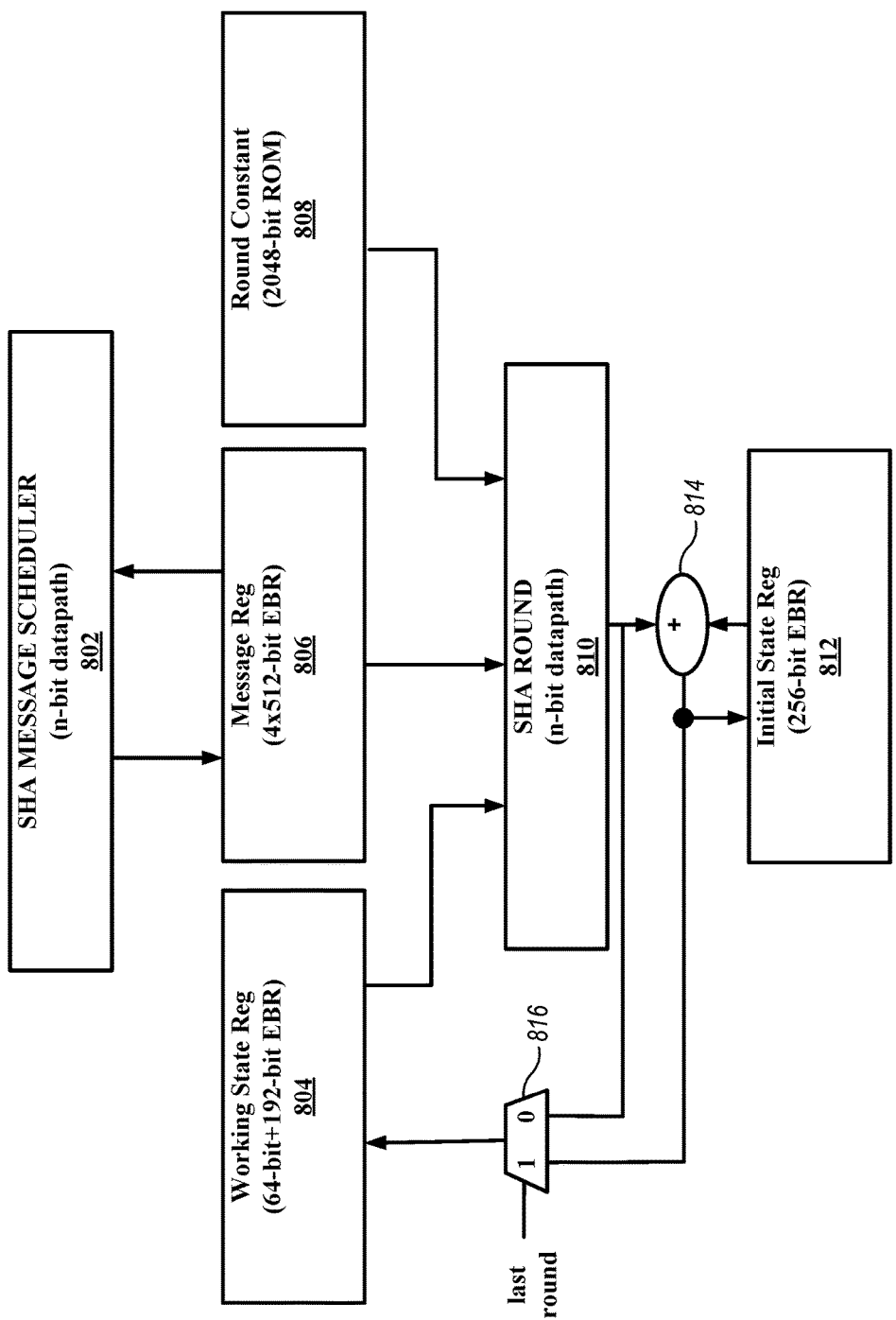
FIG. 8 is a block diagram illustrating microarchitecture of SHA-256 with memory mapping for a PLD according to one embodiment.

FIG. 8 is a block diagram illustrating microarchitecture of SHA-256 with memory mapping for a PLD according to one embodiment. In one embodiment, with the exception of the registers required for round counter and address generation, all sequential elements may be mapped to on-chip RAM and/or ROM modules. The SHA message scheduler 802 may be coupled to the message register 806, which in turn may be coupled to SHA round 810. Working state register 804 and round constant 808 may also be coupled to SHA round 810. SHA round 810 may be coupled to initial state register, which in turn may be coupled to working state register 804 via hashing combination logic 814 and mux 816, as shown in FIG. 8.

Figure 9:
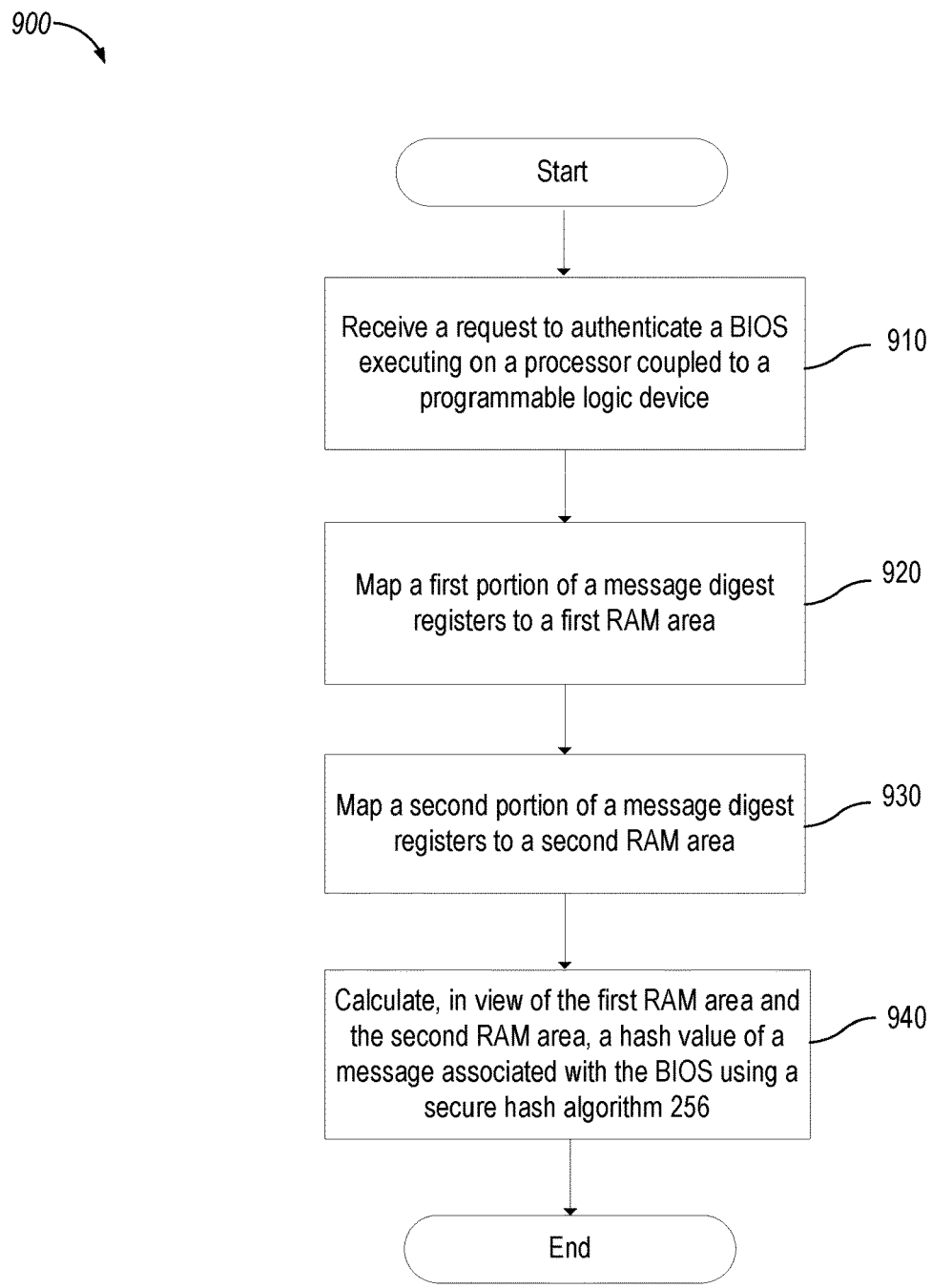
FIG. 9 illustrates a diagram of a method of performing BIOS authentication operations according to one embodiment.

FIG. 9 illustrates a diagram of a method of performing BIOS authentications operations according to one embodiment. The method 900 may be performed by processing logic that includes hardware (e.g., circuitry, dedicated logic, programmable logic, microcode, etc.), software (e.g., instructions run on a processing device to perform hardware simulation), or a combination thereof. In one embodiment, components of system 100 executing on the processor 110 or programmable logic device 101 perform method 900.

Beginning at block 910, processing logic may receive a request to authenticate a basic input/output system (BIOS) executing on a processor coupled to a programmable logic device (PLD). In one embodiment, the request may be received by the off-chip PLD. In one embodiment, the PLD is an FPGA or a CPLD. In other embodiments, various other PLDs may be used. At block 920, processing logic may map a first portion of a message digest register to a first RAM area. In one embodiment, the first RAM area may be an embedded random access memory block (EBR). In one embodiment, the first portion of the message digest register corresponds to the A and E states of the SHA-256 encryption, as described above. In one embodiment, the first EBR is 128 bits in size with a 32-bit read port and an n-bit write port. At block 930, processing logic may map a second portion of the message digest register to a second RAM area (e.g., EBR). In one embodiment, the second portion of the message digest register corresponds to the B, C, D, F, G, and H states of the SHA-256 encryption. The second EBR may be 192 bits in size with a 6n-bit read port and a 6n-bit read port.

At block 940, processing logic calculates, in view of the first EBR and the second EBR, a hash value of a message associated with the BIOS using a Secure Hash Algorithm 256 (SHA-256). In one embodiment, the hash value is calculated according to the operations described in FIGS. 2-8. In one embodiment, processing logic may compare the calculated hash value to a first value stored in the PLD. The first value stored in the PLD may be a previously determined and authenticated hash value associated with a correct version of the BIOS. In one embodiment, if the calculated hash value matches the first value stored in the PLD, the BIOS is authenticated.

FIG. 10A is a block diagram illustrating a micro-architecture for a processor 1000 that implements BIOS authentication operations, according to one embodiment. Specifically, processor 1000 depicts an in-order architecture core and a register renaming logic, out-of-order issue/execution logic to be included in a processor according to at least one embodiment of the disclosure. The embodiments of the BIOS authentication operations described herein can be implemented in processor 1000.

Processor 1000 includes a front end unit 1030 coupled to an execution engine unit 1050, and both are coupled to a memory unit 1070. The processor 1000 may include a reduced instruction set computing (RISC) core, a complex instruction set computing (CISC) core, a very long instruction word (VLIW) core, or a hybrid or alternative core type. As yet another option, processor 1000 may include a special-purpose core, such as, for example, a network or communication core, compression engine, graphics core, or the like. In one embodiment, processor 1000 may be a multi-core processor or may be part of a multiprocessor system.

The front end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit 1040 (also known as a decoder) may decode instructions and generate as an output one or more micro-operations, microcode entry points, microinstructions, other instructions, or other control signals, which are decoded from, or which otherwise reflect, or are derived from, the original instructions. The decoder 1040 may be implemented using various different mechanisms. Examples of suitable mechanisms include, but are not limited to, look-up tables, hardware implementations, programmable logic arrays (PLAs), microcode read only memories (ROMs), etc. The instruction cache unit 1034 is further coupled to the memory unit 1070. The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations (RS), central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 1058 is overlapped by the retirement unit 1054 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which may include a data prefetcher 1080, a data TLB unit 1072, a data cache unit (DCU) 1074, and a level 2 (L2) cache unit 1076, to name a few examples. In some embodiments DCU 1074 is also known as a first level data cache (L1 cache). The DCU 1074 may handle multiple outstanding cache misses and continue to service incoming stores and loads. It also supports maintaining cache coherency. The data TLB unit 1072 is a cache used to improve virtual address translation speed by mapping virtual and physical address spaces. In one exemplary embodiment, the memory access units 1064 may include a load unit, a store address unit, and a store data unit, each of which is coupled to the data TLB unit 1072 in the memory unit 1070. The L2 cache unit 1076 may be coupled to one or more other levels of cache and eventually to a main memory.

In one embodiment, the data prefetcher 1080 speculatively loads/prefetches data to the DCU 1074 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 1000 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 10B is a block diagram illustrating an in-order pipeline and a register renaming stage, out-of-order issue/execution pipeline implemented by processor 1000 of FIG. 10A according to some embodiments of the disclosure. The solid lined boxes in FIG. 10B illustrate an in-order pipeline, while the solid lined boxes in combination with the dashed lined boxes illustrate a register renaming, out-of-order issue/execution pipeline. In FIG. 10B, a processor pipeline 1001 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024. In some embodiments, the ordering of stages 1002-1024 may be different than illustrated and are not limited to the specific ordering shown in FIG. 10B.

Figure 11:
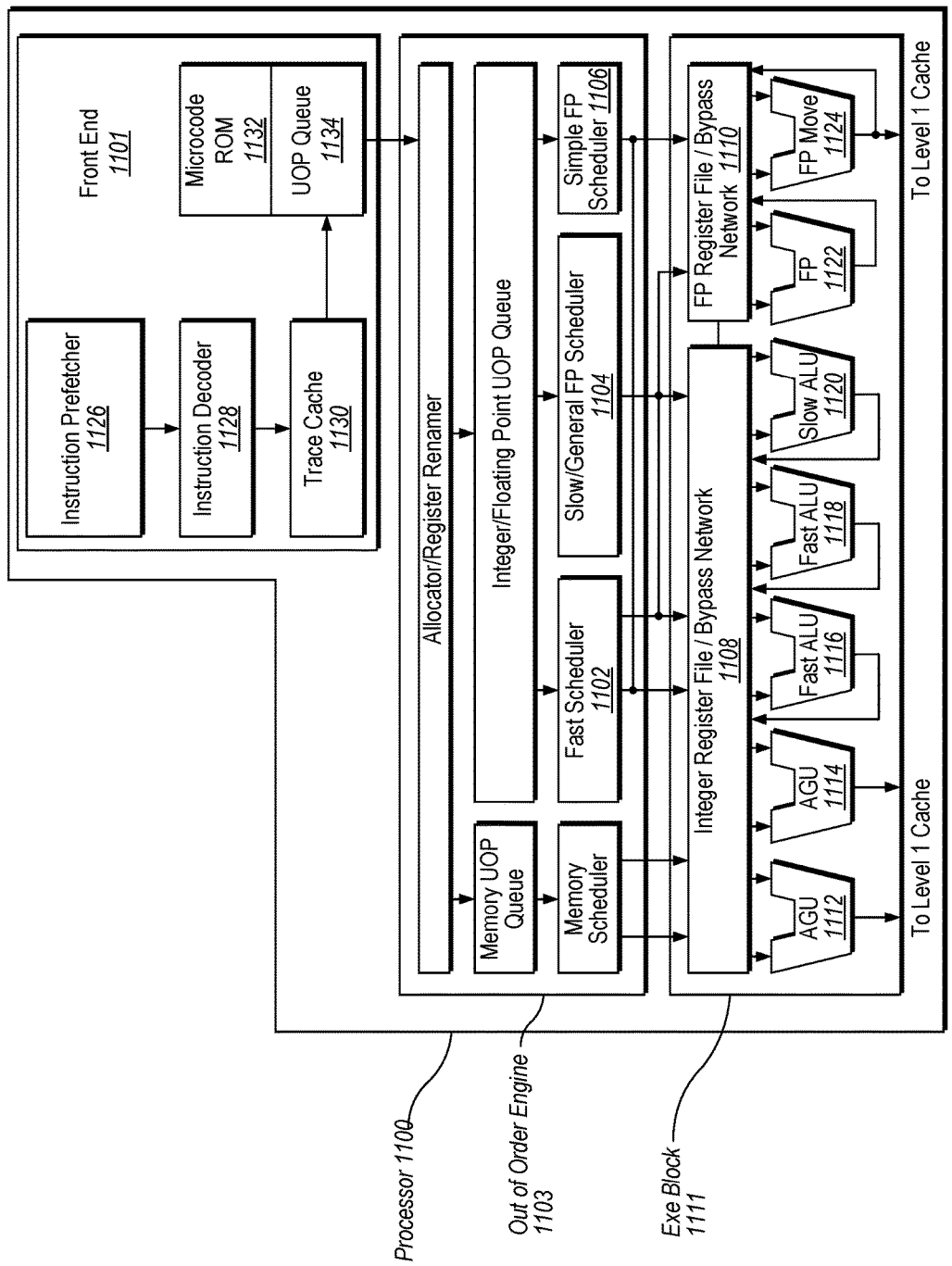
FIG. 11 illustrates a block diagram of the micro-architecture for a processor that includes logic circuits to perform BIOS authentication operations according to one embodiment.

FIG. 11 illustrates a block diagram of the micro-architecture for a processor 1100 that includes logic circuits to perform BIOS authentication operations, according to one embodiment. In some embodiments, BIOS authentication instructions in accordance with one embodiment can be implemented to operate on data elements having sizes of byte, word, doubleword, quadword, etc., as well as datatypes, such as single and double precision integer and floating point datatypes. In one embodiment the in-order front end 1101 is the part of the processor 1100 that fetches instructions to be executed and prepares them to be used later in the processor pipeline. The embodiments of the BIOS authentication operations disclosed herein can be implemented in processor 1100.

The front end 1101 may include several units. In one embodiment, the instruction prefetcher 1126 fetches instructions from memory and feeds them to an instruction decoder 1128 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 1130 takes decoded uops and assembles them into program ordered sequences or traces in the uop queue 1134 for execution. When the trace cache 1130 encounters a complex instruction, the microcode ROM 1132 provides the uops needed to complete the operation.

Some instructions are converted into a single micro-op, whereas others need several micro-ops to complete the full operation. In one embodiment, if more than four micro-ops are needed to complete an instruction, the decoder 1128 accesses the microcode ROM 1132 to do the instruction. For one embodiment, an instruction can be decoded into a small number of micro ops for processing at the instruction decoder 1128. In another embodiment, an instruction can be stored within the microcode ROM 1132 should a number of micro-ops be needed to accomplish the operation. The trace cache 1130 refers to an entry point programmable logic array (PLA) to determine a correct micro-instruction pointer for reading the micro-code sequences to complete one or more instructions in accordance with one embodiment from the micro-code ROM 1132. After the microcode ROM 1132 finishes sequencing micro-ops for an instruction, the front end 1101 of the machine resumes fetching micro-ops from the trace cache 1130.

The out-of-order execution engine 1103 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 1102, slow/general floating point scheduler 1104, and simple floating point scheduler 1106. The uop schedulers 1102, 1104, 1106, determine when a uop is ready to execute based on the readiness of their dependent input register operand sources and the availability of the execution resources the uops need to complete their operation. The fast scheduler 1102 of one embodiment can schedule on each half of the main clock cycle while the other schedulers can only schedule once per main processor clock cycle. The schedulers arbitrate for the dispatch ports to schedule uops for execution.

Register files 1108, 1110, sit between the schedulers 1102, 1104, 1106, and the execution units 1112, 1114, 1116, 1118, 1120, 1122, 1124 in the execution block 1111. There is a separate register file 1108, 1110, for integer and floating point operations, respectively. Each register file 1108, 1110, of one embodiment also includes a bypass network that can bypass or forward just completed results that have not yet been written into the register file to new dependent uops. The integer register file 1108 and the floating point register file 1110 are also capable of communicating data with the other. For one embodiment, the integer register file 1108 is split into two separate register files, one register file for the low order 32 bits of data and a second register file for the high order 32 bits of data. The floating point register file 1110 of one embodiment has 128-bit wide entries because floating point instructions typically have operands from 64 to 128 bits in width.

The execution block 1111 contains the execution units 1112, 1114, 1116, 1118, 1120, 1122, 1124, where the instructions are actually executed. This section includes the register files 1108, 1110, that store the integer and floating point data operand values that the micro-instructions need to execute. The processor 1100 of one embodiment includes a number of execution units: address generation unit (AGU) 1112, AGU 1114, fast ALU 1116, fast ALU 1118, slow ALU 1120, floating point ALU 1122, floating point move unit 1124. For one embodiment, the floating point execution blocks 1112, 1114, execute floating point, MMX, SIMD, and SSE, or other operations. The floating point ALU 1112 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 1116, 1118. The fast ALUs 1116, 1118, of one embodiment can execute fast operations with an effective latency of half a clock cycle. For one embodiment, most complex integer operations go to the slow ALU 1110 as the slow ALU 1110 includes integer execution hardware for long latency type of operations, such as a multiplier, shifts, flag logic, and branch processing. Memory load/store operations are executed by the AGUs 1112, 1114. For one embodiment, the integer ALUs 1116, 1118, 1120, are described in the context of performing integer operations on 64 bit data operands. In alternative embodiments, the ALUs 1116, 1118, 1120, can be implemented to support a variety of data bits including 16, 32, 128, 256, etc. Similarly, the floating point units 1112, 1114, can be implemented to support a range of operands having bits of various widths. For one embodiment, the floating point units 1112, 1114, can operate on 128-bits wide packed data operands in conjunction with SIMD and multimedia instructions.

In one embodiment, the uops schedulers 1102, 1104, 1106, dispatch dependent operations before the parent load has finished executing. As uops are speculatively scheduled and executed in processor 1100, the processor 1100 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 1100 also includes logic to implement BIOS authentication operations according to one embodiment. In one embodiment, the execution block 1111 of processor 1100 may include a microcontroller (MCU), to perform BIOS authentication operations according to the description herein.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 12:
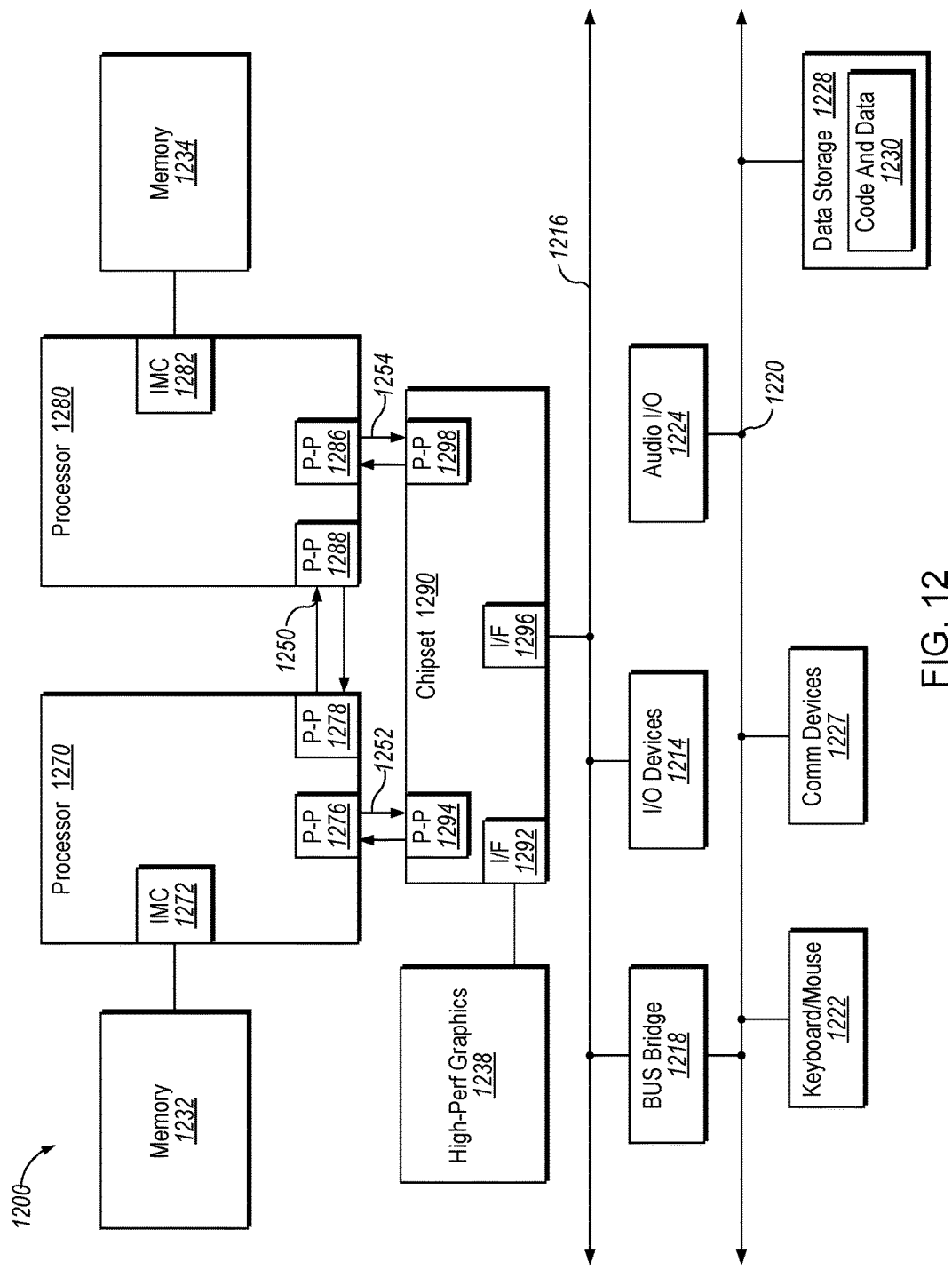
FIG. 12 is a block diagram of a computer system according to one embodiment.

Embodiments may be implemented in many different system types. Referring now to FIG. 12, shown is a block diagram of a multiprocessor system 1200 in accordance with an implementation. As shown in FIG. 12, multiprocessor system 1200 is a point-to-point interconnect system, and includes a first processor 1270 and a second processor 1280 coupled via a point-to-point interconnect 1250. As shown in FIG. 12, each of processors 1270 and 1280 may be multicore processors, including first and second processor cores, although potentially many more cores may be present in the processors. The processors each may include hybrid write mode logics in accordance with an embodiment of the present. BIOS authentication operations discussed herein can be implemented in the processor 1270, processor 1280, or both.

While shown with two processors 1270, 1280, it is to be understood that the scope of the present disclosure is not so limited. In other implementations, one or more additional processors may be present in a given processor.

Processors 1270 and 1280 are shown including integrated memory controller units 1272 and 1282, respectively. Processor 1270 also includes as part of its bus controller units point-to-point (P-P) interfaces 1276 and 1288; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may also exchange information with a high-performance graphics circuit 1238 via a high-performance graphics interface 1239.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1292. In one embodiment, first bus 1216 may be a Peripheral Component Interconnect (PCI) bus, or a bus such as a PCI Express bus or another third generation I/O interconnect bus, although the scope of the present disclosure is not so limited.

As shown in FIG. 12, various I/O devices 1214 may be coupled to first bus 1216, along with a bus bridge 1218 which couples first bus 1216 to a second bus 1220. In one embodiment, second bus 1220 may be a low pin count (LPC) bus. Various devices may be coupled to second bus 1220 including, for example, a keyboard and/or mouse 1222, communication devices 1227 and a storage unit 1228 such as a disk drive or other mass storage device which may include instructions/code and data 1230, in one embodiment.

Further, an audio I/O 1224 may be coupled to second bus 1220. Note that other architectures are possible. For example, instead of the point-to-point architecture of FIG. 12, a system may implement a multi-drop bus or other such architecture.

Figure 13:
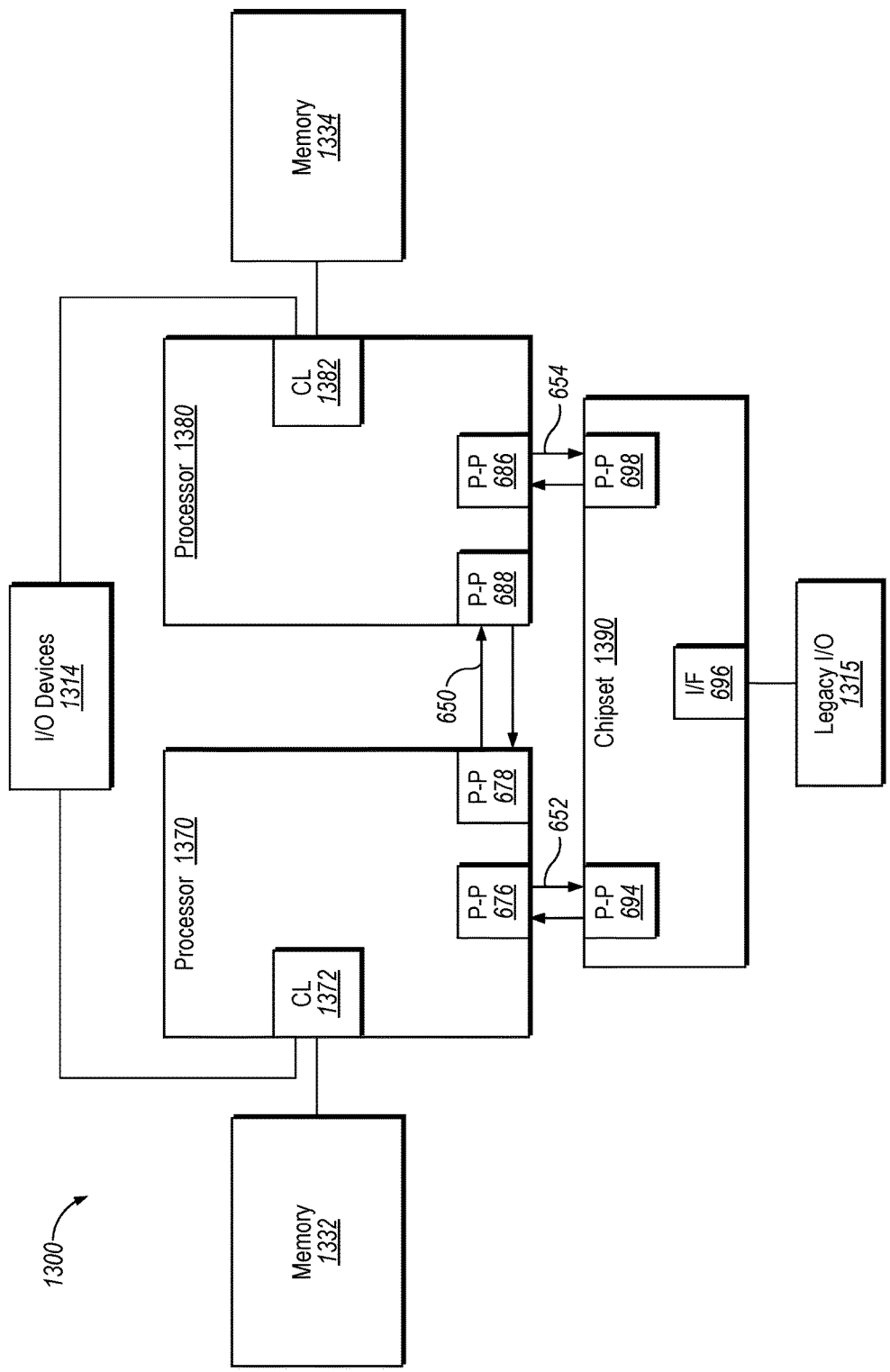
FIG. 13 is a block diagram of a computer system according to another embodiment.

Referring now to FIG. 13, shown is a block diagram of a third system 1300 in accordance with an embodiment of the present disclosure. Like elements in FIGS. 11 and 12 bear like reference numerals, and certain aspects of FIG. 12 have been omitted from FIG. 12 in order to avoid obscuring other aspects of FIG. 13.

FIG. 13 illustrates that the processors 1370, 1380 may include integrated memory and I/O control logic ("CL") 1372 and 1382, respectively. For at least one embodiment, the CL 1372, 1382 may include integrated memory controller units such as described herein. In addition. CL 1372, 1382 may also include I/O control logic. FIG. 13 illustrates that the memories 1332, 1334 are coupled to the CL 1372, 1382, and that I/O devices 1314 are also coupled to the control logic 1372, 1382. Legacy I/O devices 1315 are coupled to the chipset 1390. Operations discussed herein can be implemented in the processor 1370, processor 1380, or both.

Figure 14:
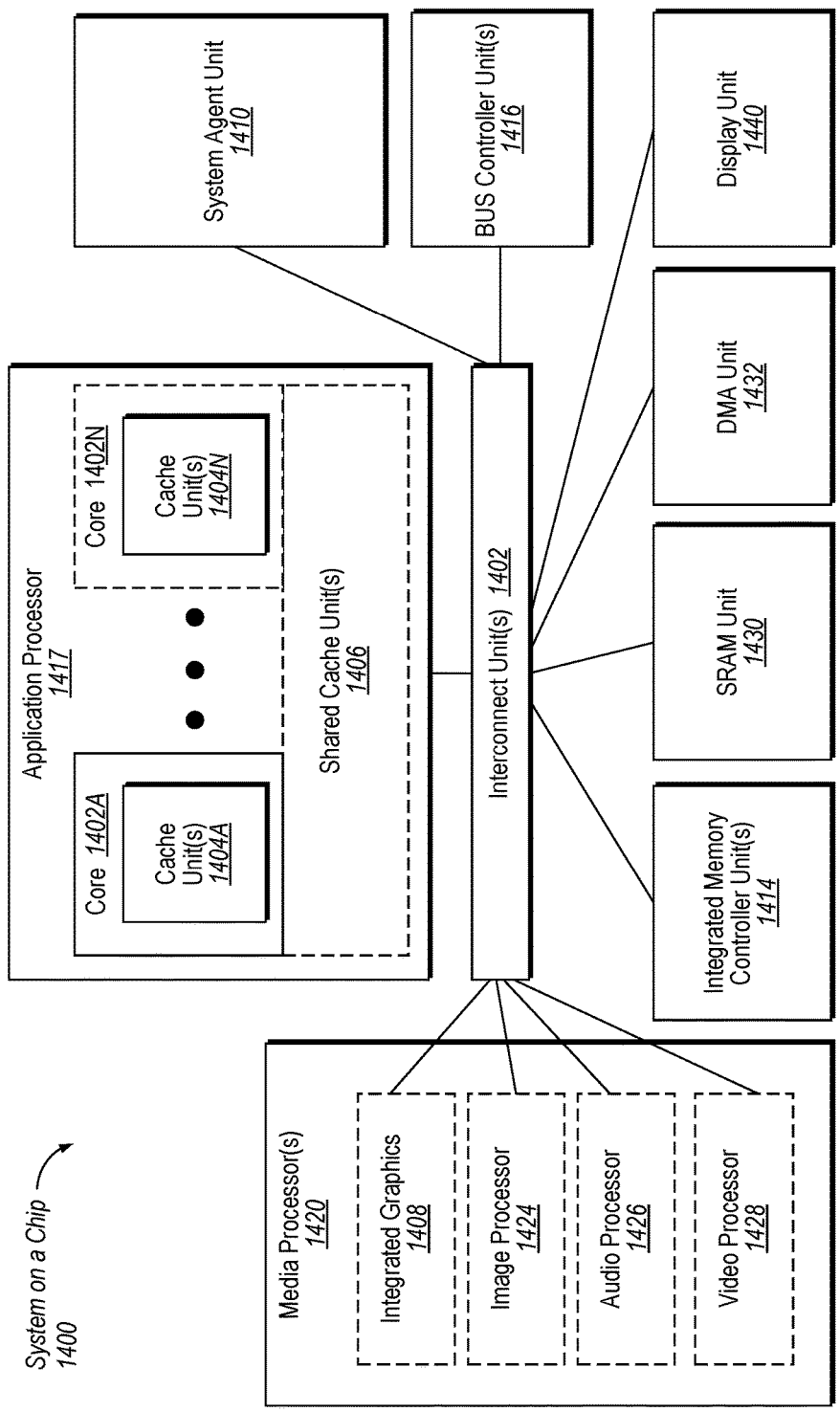
FIG. 14 is a block diagram of a system-on-a-chip according to one embodiment.

FIG. 14 is an exemplary system on a chip (SoC) 1400 that may include one or more of the cores 1402. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

FIG. 14 is a block diagram of a SoC 1400 in accordance with an embodiment of the present disclosure. Dashed lined boxes are features on more advanced SoCs. In FIG. 14 an interconnect unit(s) 1402 is coupled to: an application processor 1417 which includes a set of one or more cores 1402A-N, cache unit(s) 1404A-N, and shared cache unit(s) 1406; a system agent unit 1410; a bus controller unit(s) 1416; an integrated memory controller unit(s) 1414; a set or one or more media processors 1420 which may include integrated graphics logic 1408, an image processor 1424 for providing still and/or video camera functionality, an audio processor 1426 for providing hardware audio acceleration, and a video processor 1428 for providing video encode/decode acceleration; a static random access memory (SRAM) unit 1430; a direct memory access (DMA) unit 1432; and a display unit 1440 for coupling to one or more external displays. BIOS authentication operations discussed herein can be implemented by SoC 1400.

Figure 15:
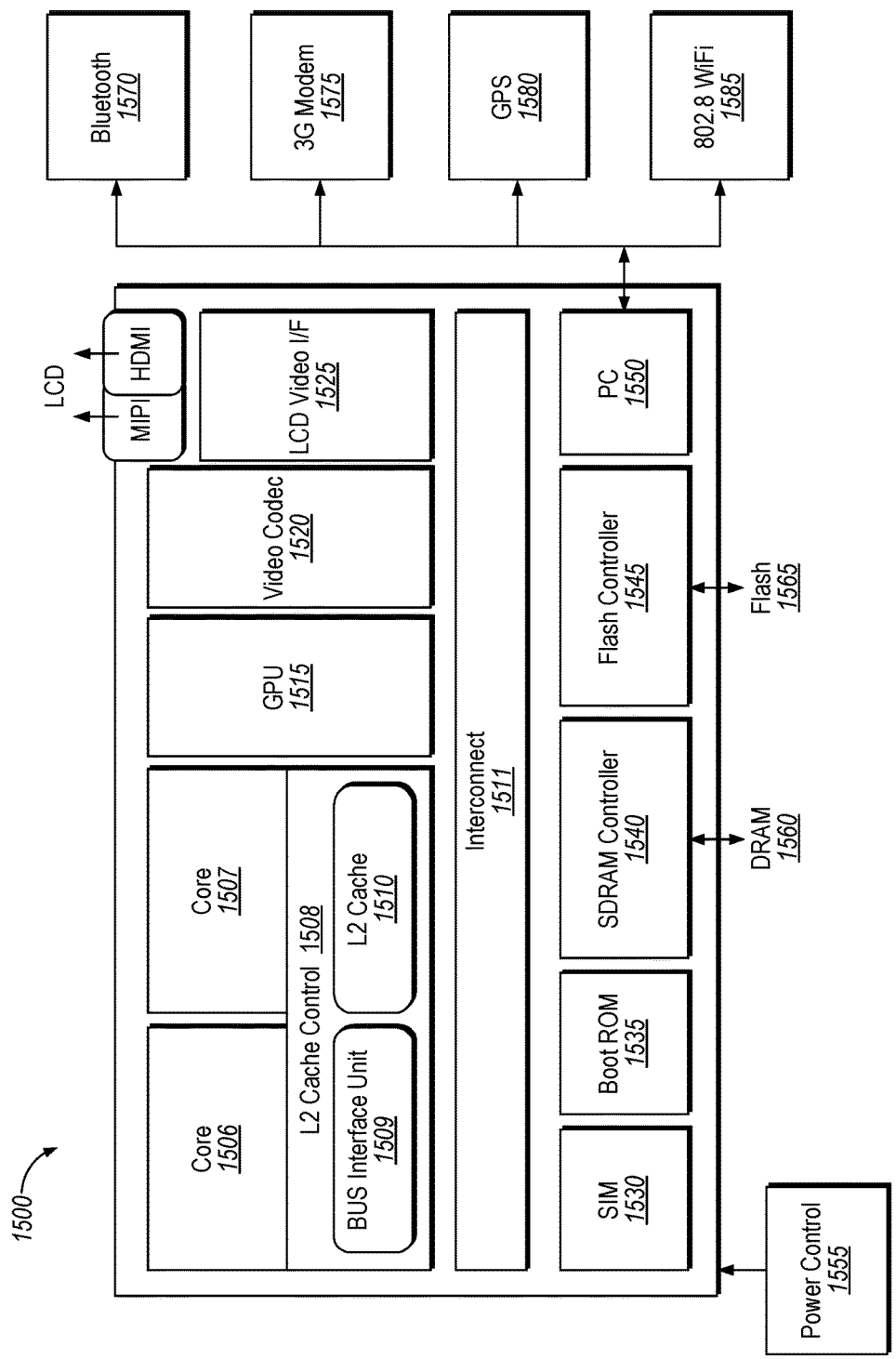
FIG. 15 illustrates another implementation of a block diagram for a computing system according to one embodiment.

Turning next to FIG. 15, an embodiment of a system on-chip (SoC) design in accordance with embodiments of the disclosure is depicted. As an illustrative example, SoC 1500 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. BIOS authentication operations discussed herein can be implemented by SoC 1500.

Here, SoC 1500 includes 2 cores—1506 and 1507. Similar to the discussion above, cores 1506 and 1507 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1506 and 1507 are coupled to cache control 1508 that is associated with bus interface unit 1509 and L2 cache 1510 to communicate with other parts of system 1500. Interconnect 1511 includes an on-chip interconnect, such as an IOSF, AMBA, or other interconnects discussed above, which can implement one or more aspects of the described disclosure.

Interconnect 1511 provides communication channels to the other components, such as a Subscriber Identity Module (SIM) 1530 to interface with a SIM card, a boot ROM 1535 to hold boot code for execution by cores 1506 and 1507 to initialize and boot SoC 1500, a SDRAM controller 1540 to interface with external memory (e.g. DRAM 1560), a flash controller 1545 to interface with non-volatile memory (e.g. Flash 1565), a peripheral control 1550 (e.g. Serial Peripheral Interface) to interface with peripherals, power control 1555 to control power, video codecs 1520 and Video interface 1525 to display and receive input (e.g. touch enabled input), GPU 1515 to perform graphics related computations, etc. Any of these interfaces may incorporate aspects of the embodiments described herein.

In addition, the system illustrates peripherals for communication, such as a Bluetooth module 1570, 3G modem 1575, GPS 1580, and Wi-Fi 1585. Note as stated above, a UE includes a radio for communication. As a result, these peripheral communication modules may not all be included. However, in a UE some form of a radio for external communication should be included.

Figure 16:
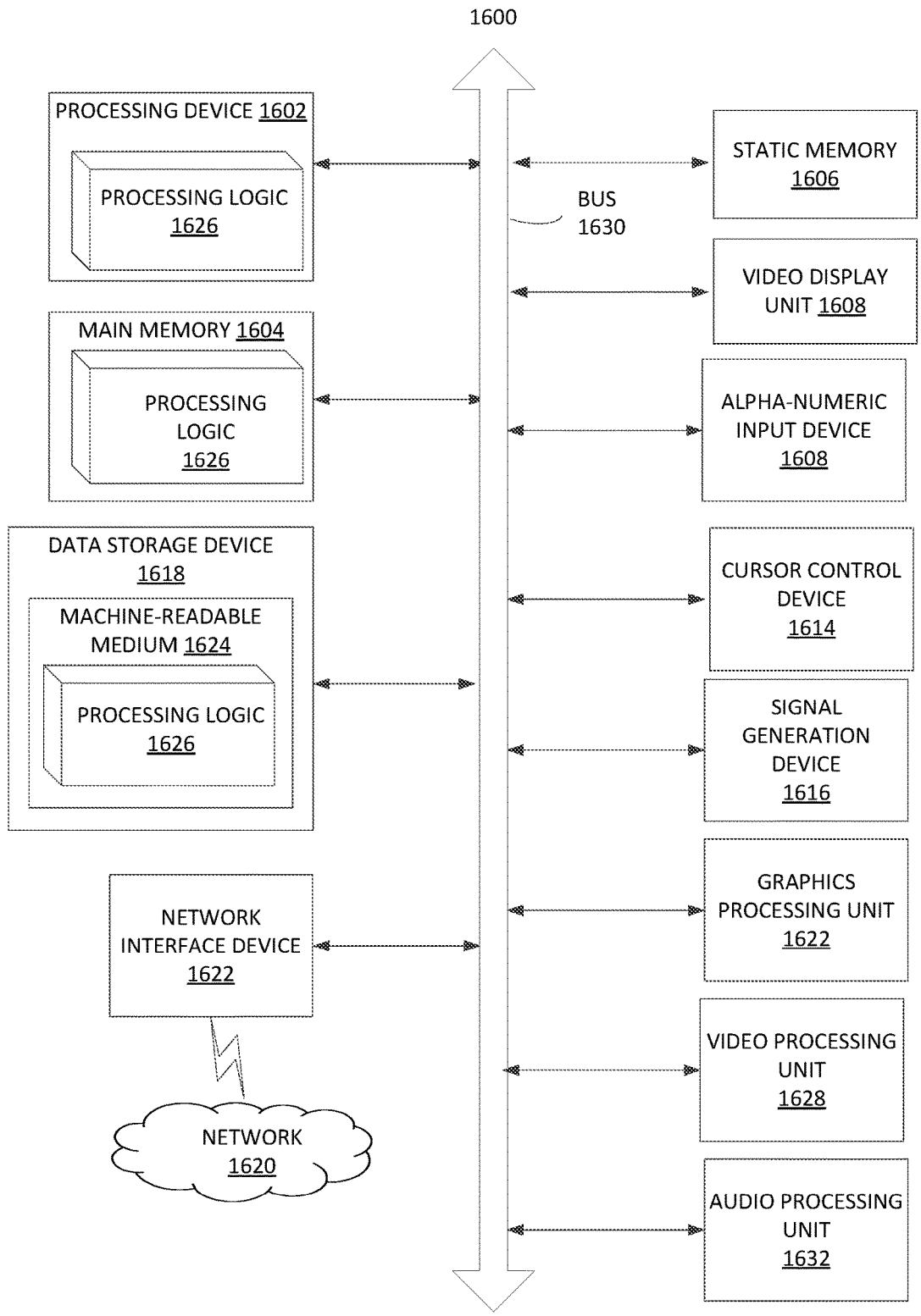
FIG. 16 illustrates another implementation of a block diagram for a computing system according to one implementation.

FIG. 16 illustrates a diagrammatic representation of a machine in the example form of a computing system 1600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The embodiments of the page additions and content copying can be implemented in computing system 1600.

The computing system 1600 includes a processing device 1602, main memory 1604 (e.g., read-only memory (ROM), flash memory, dynamic random access memory (DRAM) (such as synchronous DRAM (SDRAM) or DRAM (RDRAM), etc.), a static memory 1626 (e.g., flash memory, static random access memory (SRAM), etc.), and a data storage device 1618, which communicate with each other via a bus 1630.

Processing device 1602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1602 may also be one or more special-purpose processing devices such as an application specific integrated circuit (ASIC), a field programmable gate array (FPGA), a digital signal processor (DSP), network processor, or the like. In one embodiment, processing device 1602 may include one or processor cores. The processing device 1602 is configured to execute the processing logic 1626 for performing the BIOS authentication operations discussed herein. In one embodiment, processing device 1602 can be part of a computing system. Alternatively, the computing system 1600 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1600 may further include a network interface device 1622 communicably coupled to a network 1620. The computing system 1600 also may include a video display unit 1608 (e.g., a liquid crystal display (LCD) or a cathode ray tube (CRT)), an alphanumeric input device 1610 (e.g., a keyboard), a cursor control device 1614 (e.g., a mouse), a signal generation device 1616 (e.g., a speaker), or other peripheral devices. Furthermore, computing system 1600 may include a graphics processing unit 1622, a video processing unit 1628 and an audio processing unit 1632. In another embodiment, the computing system 1600 may include a chipset (not illustrated), which refers to a group of integrated circuits, or chips, that are designed to work with the processing device 1602 and controls communications between the processing device 1602 and external devices. For example, the chipset may be a set of chips on a motherboard that links the processing device 1602 to very high-speed devices, such as main memory 1604 and graphic controllers, as well as linking the processing device 1602 to lower-speed peripheral buses of peripherals, such as USB, PCI or ISA buses.

The data storage device 1618 may include a computer-readable storage medium 1624 on which is stored software 1626 embodying any one or more of the methodologies of functions described herein. The software 1626 may also reside, completely or at least partially, within the main memory 1604 as instructions 1626 and/or within the processing device 1602 as processing logic 1626 during execution thereof by the computing system 1600; the main memory 1604 and the processing device 1602 also constituting computer-readable storage media.

The computer-readable storage medium 1624 may also be used to store instructions 1626 utilizing the processing device 1602 and/or a software library containing methods that call the above applications. While the computer-readable storage medium 1624 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is a programmable logic device (PLD) comprising: a static random-access memory (SRAM) area comprising programmable logic in a Lookup Table (LUT) to receive a request to authenticate a basic input/output system (BIOS) executing on a processor coupled to the PLD, wherein the programmable logic is to: calculate a hash value of a message associated with the BIOS using a Secure Hash Algorithm (SHA); and a random-access memory (RAM) area, the RAM area comprising: a first RAM area to store a first portion of a message digest associated with the message and a fifth portion of the message digest associated with the message; and a second RAM area to store a second portion of the message digest, a third portion of the message digest, a fourth portion of the message digest, a sixth portion of the message digest, a seventh portion of the message digest, and an eighth portion of the message digest, the message digest associated with the message.

In Example 2, the subject matter of Example 1, wherein the message digest comprises eight 32-bit words, and wherein each portion of the message digest corresponds to one of the 32-bit words.

In Example 3, the subject matter of Example 1, wherein the programmable logic comprises hashing combination logic to combine a message digest with a 512-bit state message to calculate the hash value of the message associated with the BIOS.

In Example 4, the subject matter of Example 1, wherein the first RAM area comprises an Embedded block RAM (EBR), and wherein the EBR is a 128-bit EBR with a 32-bit read port and a size of a write port corresponding to a size of a datapath associated with the message digest.

In Example 5, the subject matter of Example 4, wherein the size of the datapath is 32-bits.

In Example 6, the subject matter of Example 1, wherein the second RAM area comprises an Embedded block RAM (EBR), and wherein the EBR is a 192-bit EBR with a 32-bit read port and a size of a write port corresponding to six times a size of a datapath associated with the message digest.

In Example 7, the subject matter of Example 1, the RAM area further comprising: a set of four Embedded block RAM (EBR) to store four portions of a message to be hashed; an embedded read-only memory (ROM) to access a round constant; and an initial state EBR to store an initial state of the message digest.

In Example 8, the subject matter of Example 1, wherein the programmable logic device is disposed on a circuit board and is coupled to a processor also disposed on the circuit board.

In Example 9, the subject matter of Example 1, wherein the programmable logic device is an off-chip programmable logic device comprising at least one of a field programmable gate array (FPGA) or a complex programmable logic device (CPLD).

Example 10 is a method comprising: receiving, by an off-chip programmable logic device, a request to authenticate a basic input/output system (BIOS) executing on a processor coupled to a programmable logic device (PLD); mapping, by the off-chip programmable logic device, a first portion of a message digest register to a first RAM area; mapping, by the off-chip programmable logic device, a second portion of the message digest register to a second RAM area; and calculating, by the off-chip programmable logic device in view of the first RAM area and the second RAM area, a hash value of a message associated with the BIOS using a Secure Hash Algorithm (SHA).

In Example 11, the subject matter of Example 10, wherein the message digest register is 256-bits, the first RAM area is a 128-bit Embedded block RAM (EBR), and the second RAM area is a 192-bit EBR.

In Example 12, the subject matter of Example 10, further comprising: mapping four portions of a message register to a first set of four Embedded block RAM (EBR), respectively, the first set of four EBRs to store a first message; and allocating a second set of four EBRs to store a second message.

In Example 13, the subject matter of Example 12, further comprising: allocating a read only memory (ROM) to store round constants; and allocating a 256-bit EBR to store a 256-bit initial state.

In Example 14, the subject matter of Example 10, wherein the off-chip programmable logic device comprises at least one of a field programmable gate array (FPGA) or a complex programmable logic device (CPLD).

Example 15 is a system, comprising: a circuit board; a processor disposed in a first location of the circuit board; an off-chip programmable logic device (PLD) operatively coupled to the processor, disposed in a second location of the circuit board, wherein the off-chip programmable logic device is to: receive a request to authenticate a basic input/output system (BIOS) executing on the processor operatively coupled to the PLD; map a first portion of a message digest register to a first RAM area; map a second portion of the message digest register to a second RAM area; and calculate, in view of the first RAM area and the second RAM area, a hash value of a message associated with the BIOS using a Secure Hash Algorithm (SHA).

In Example 16, the subject matter of Example 15, wherein the message digest register is 256-bits, the first RAM area is a 128-bit Embedded block RAM (EBR), and the second EBR is a 192-bit EBR.

In Example 17, the subject matter of Example 15, wherein the PLD is further to: map four portions of a message register to a first set of four Embedded block RAM (EBR), respectively, the first set of four EBRs to store a first message; and allocate a second set of four EBRs to store a second message.

In Example 18, the subject matter of Example 17, wherein the PLD is further to: allocate a read only memory (ROM) to store round constants; and allocate a 256-bit EBR to store a 256-bit initial state.

In Example 19, the subject matter of Example 15, wherein the PLD is further to combine a message digest with a 512-bit state message to calculate the hash value of the message associated with the BIOS.

In Example 20, the subject matter of Example 15, wherein the PLD comprises at least one of a field programmable gate array (FPGA) or a complex programmable logic device (CPLD).

Example 21 is an apparatus comprising: means for receiving a request to authenticate a basic input/output system (BIOS) executing on a processor coupled to a programmable logic device (PLD); means for mapping a first portion of a message digest register to a first RAM area; means for mapping a second portion of the message digest register to a second RAM area; and means for calculating, in view of the first RAM area and the second RAM area, a hash value of a message associated with the BIOS using a Secure Hash Algorithm (SHA).

In Example 22, the subject matter of Example 21, further comprising: means for mapping four portions of a message register to a first set of four Embedded block RAM (EBR), respectively, the first set of four EBRs to store a first message; and means for allocating a second set of four EBRs to store a second message.

In Example 23, the subject matter of Example 22, further comprising: means for allocating a read only memory (ROM) to store round constants; and means for allocating a 256-bit EBR to store a 256-bit initial state.

In Example 24, the subject matter of Examples 10-14, an apparatus comprising means for performing the method of any one of claims 10 to 14.

In Example 25, the subject matter of Examples 10-14, an apparatus comprising a processor configured to perform the method of any one of claims 10 to 14.

In Example 26, the subject matter of Examples 10-14, a machine readable medium including code, when executed, to cause a machine to perform the method of any one of claims 10-14.

Example 27 is a machine readable medium including code, when executed, to cause a machine to: receive a request to authenticate a basic input/output system (BIOS) executing on the processor operatively coupled to the PLD; map a first portion of a message digest register to a first RAM area; map a second portion of the message digest register to a second RAM area; and calculate, in view of the first RAM area and the second RAM area, a hash value of a message associated with the BIOS using a Secure Hash Algorithm (SHA).

In Example 28, the subject matter of Example 27, including code, when executed, to cause a machine to: map four portions of a message register to a first set of four Embedded block RAM (EBR), respectively, the first set of four EBRs to store a first message; and allocate a second set of four EBRs to store a second message.

In Example 29, the subject matter of Example 27, including code, when executed, to cause a machine to: map four portions of a message register to a first set of four Embedded block RAM (EBR), respectively, the first set of four EBRs to store a first message; and allocate a second set of four EBRs to store a second message.

In Example 30, the subject matter of Example 29, including code, when executed, to cause a machine to: allocate a read only memory (ROM) to store round constants; and allocate a 256-bit EBR to store a 256-bit initial state.

In Example 31, the subject matter of Example 27, including code, when executed, to cause a machine to combine a message digest with a 512-bit state message to calculate the hash value of the message associated with the BIOS.

While embodiments of the present disclosure have been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of embodiments of the present disclosure. It will be apparent, however, to one skilled in the art that these specific details need not be employed to practice embodiments of the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring embodiments of the present disclosure.

The embodiments are described with reference to BIOS authentication operations in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, embodiments of the present disclosure are not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "storing," "decoding," "identifying," receiving," "mapping," calculating," "comparing," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A programmable logic device (PLD) comprising: a static random-access memory (SRAM) area comprising programmable logic embodied within one of lookup table (LUT) modules or macrocells, the programmable logic to: receive a request to authenticate a basic input/output system (BIOS) executing on a processor coupled to the PLD, wherein the PLD is off-chip from the processor; and calculate, in response to the request, a hash value of a message associated with derived from code of the BIOS using a secure hash algorithm (SHA) wherein to calculate comprises to execute a plurality of rounds of the SHA on the message; and a random-access memory (RAM) area, the RAM area comprising: a first RAM area to store a first portion of a message digest associated with the message and a fifth portion of the message digest associated with the message, wherein the message digest comprises one of a constant initial hash state for a first round and a previous hash state for a subsequent round of the plurality of rounds of the SHA; and a second RAM area to store a second portion of the message digest, a third portion of the message digest, a fourth portion of the message digest, a sixth portion of the message digest, a seventh portion of the message digest, and an eighth portion of the message digest, wherein the message digest is associated with the message; and wherein, upon completion of the plurality of rounds of the SHA, the programmable logic is to: retrieve the first portion through the eighth portion of the message digest stored in the RAM area with which to calculate the hash value; and authenticate the BIOS via comparison of the hash value with an original hash value.

2. The programmable logic device of claim 1, wherein the message digest comprises eight 32-bit words, and wherein each portion of the message digest corresponds to one of the 32-bit words.

3. The programmable logic device of claim 1, wherein the programmable logic comprises hashing combination logic to combine a message digest with a 512-bit state message to calculate the hash value of the message associated with the BIOS.

4. The programmable logic device of claim 1, wherein the first RAM area comprises an embedded block RAM (EBR), and wherein the EBR is a 128-bit EBR with a 32-bit read port and a size of a write port corresponding to a size of a datapath associated with the message digest.

5. The programmable logic device of claim 4, wherein the size of the datapath is 32-bits.

6. The programmable logic device of claim 1, wherein the second RAM area comprises an embedded block RAM (EBR), and wherein the EBR is a 192-bit EBR with a 32-bit read port and a size of a write port corresponding to six times a size of a datapath associated with the message digest.

7. The programmable logic device of claim 1, wherein the RAM area further comprising comprises: a set of four embedded block RAM (EBRs) to store four portions of the message to be hashed; an embedded read-only memory (ROM) to access a round constant; and an initial state EBR to store the constant initial hash state of the message digest.

8. The programmable logic device of claim 1, wherein the programmable logic device is disposed on a circuit board and is coupled to a processor also disposed on the circuit board.

9. The programmable logic device of claim 1, wherein the programmable logic device is at least one of a field programmable gate array (FPGA) device or a complex programmable logic device (CPLD).

10. A method comprising: receiving, by programmable logic embodied within one of lookup table (LUT) modules or macrocells of an off-chip programmable logic device (PLD), a request to authenticate a basic input/output system (BIOS) executing on a processor coupled to the off-chip PLD; mapping, by the programmable logic, a first portion of a message digest register to a first embedded block random access memory (EBR) RAM area of the off-chip PLD; mapping, by the programmable logic, a second portion of the message digest register to a second EBR RAM area of the off-chip PLD; calculating, by the programmable logic in view of using a first set of hash states stored in the first EBR RAM area and a second set of hash states stored in the second EBR RAM area, a hash value of a message associated with, which is derived from code of the BIOS2 using by executing a plurality of rounds of a secure hash algorithm (SHA) on the first set of hash states and the second set of hash states; storing, in the first EBR, a combination of the first set of hash states between each round of the plurality of rounds of the SHA; storing, in the second EBR, a combination of the second set of hash states between each round of the plurality rounds of the SHA; and authenticating, by the programmable logic, the BIOS via comparison of the hash value with an original hash value.

11. The method of claim 10, wherein the message digest register is 256-bits, the first RAM area EBR is a 128-bit Embedded block RAM (EBR) EBR, and the second RAM area EBR is a 192-bit EBR.

12. The method of claim 10, further comprising: mapping four portions of a message register to a first set of four embedded block RAM (EBR) EBRs, respectively, the first set of four EBRs to store a first message; and allocating a second set of four EBRs to store a second message.

13. The method of claim 12, further comprising: allocating a read only memory (ROM) to store round constants; and allocating a 256-bit EBR to store a 256-bit initial hash state.

14. The method of claim 10, wherein the off-chip programmable logic device comprises at least one of a field programmable gate array (FPGA) or a complex programmable logic device (CPLD), a circuit board; a processor disposed in a first location of the circuit board; and an off-chip programmable logic device (PLD) operatively coupled to the processor, disposed in a second location of the circuit board, wherein programmable logic of the off-chip PLD is to: receive a request to authenticate a basic input/output system (BIOS) executing on the processor operatively coupled to the off-chip PLD; map a first portion of a message digest register to a first embedded block random access memory (EBR) RAM area of the off-chip PLD; map a second portion of the message digest register to a second EBR RAM area of the off-chip PLD; calculate, in view of using a set of first hash states stored in the first RAM area first EBR and a set of second hash states stored in the second EBR RAM area, a hash value of a message associated with, which is derived from code of the BIOS2 using via execution of a plurality of rounds of a secure hash algorithm (SHA) on the first set of hash states and the second set of hash states; store, in the first EBR, a combination of the first set of hash states between each round of the plurality of rounds of the SHA; store, in the second EBR, a combination of the second set of hash states between each round of the plurality rounds of the SHA; and authenticate the BIOS via comparison of the hash value with an original hash value.

15. A system comprising:
a circuit board;
a processor disposed in a first location of the circuit board; and
an off-chip programmable logic device (PLD) operatively coupled to the processor, disposed in a second location of the circuit board, wherein programmable logic of the off-chip PLD is to:
receive a request to authenticate a basic input/output system (BIOS) executing on the processor operatively coupled to the off-chip PLD;
map a first portion of a message digest register to a first embedded block random access memory (EBR) of the off-chip PLD;
map a second portion of the message digest register to a second EBR of the off-chip PLD;
calculate, using a set of first hash states stored in the first EBR and a set of second hash states stored in the second EBR, a hash value of a message, which is derived from code of the BIOS, via execution of a plurality of rounds of a secure hash algorithm (SHA) on the first set of hash states and the second set of hash states;
store, in the first EBR, a combination of the first set of hash states between each round of the plurality of rounds of the SHA;
store, in the second EBR, a combination of the second set of hash states between each round of the plurality rounds of the SHA; and
authenticate the BIOS via comparison of the hash value with an original hash value.

16. The system of claim 15, wherein the message digest register is 256-bits, the first RAM area EBR is a 128-bit Embedded block RAM (EBR) EBR, and the second RAM area EBR is a 192-bit EBR.

17. The system of claim 15, wherein the off-chip PLD is further to: map four portions of a message register to a first set of four embedded block RAM (EBR) EBRs, respectively, the first set of four EBRs to store a first message; and allocate a second set of four EBRs to store a second message.

18. The system of claim 17, wherein the off-chip PLD is further to: allocate a read only memory (ROM) to store round constants; and allocate a 256-bit EBR to store a 256-bit initial hash state.

19. The system of claim 15, wherein the off-chip PLD is further to combine a message digest with a 512-bit state message to calculate the hash value of the message associated with the BIOS.

20. The system of claim 15, wherein the PLD comprises at least one of a field programmable gate array (FPGA) or a complex programmable logic device (CPLD).

21. A programmable logic device (PLD) comprising: a first embedded block random access memory (EBR); a second EBR; and off-chip programmable logic coupled to the first EBR, to the second EBR, and to a processor, the processor to execute a basic input/output system (BIOS), wherein the off-chip programmable logic is to: receive a request, from the processor, to authenticate the BIOS; map a first portion of a message digest register to the first EBR; map a second portion of a message digest register to the second EBR; calculate, using a first set of hash states stored in the first EBR and a second set of hash states stored in the second EBR, a hash value of a message, which is derived from code of the BIOS, via execution of a plurality of rounds of a secure hash algorithm (SHA) on the first set of hash states and the second set of hash states; store, in the first EBR, a combination of the first set of hash states between each round of the plurality of rounds of the SHA; store, in the second EBR, a combination of the second set of hash states between each round of the plurality rounds of the SHA; and authenticate the BIOS via comparison of the hash value with an original hash value.

22. The programmable logic device of claim 21, wherein the message digest register is 256-bits, the first EBR is a 128-bit EBR, and the second EBR is a 192-bit EBR.

23. The programmable logic device of claim 21, wherein the off-chip programmable logic is further to: map four portions of a message register to a first set of four EBRs, respectively, the first set of four EBRs to store a first message; and allocate a second set of four EBRs to store a second message.

24. The programmable logic device of claim 23, wherein the off-chip programmable logic is further to: allocate a read only memory (ROM) to store round constants; and allocate a 256-bit EBR to store a 256-bit initial hash state.

* * * * *